(12) United States Patent
Aiba et al.

(10) Patent No.: US 10,763,946 B2
(45) Date of Patent: *Sep. 1, 2020

(54) TERMINAL DEVICE, BASE STATION DEVICE, COMMUNICATION METHOD, AND INTEGRATED CIRCUIT

(71) Applicant: Sharp Kabushiki Kaisha, Sakai, Osaka (JP)

(72) Inventors: Tatsushi Aiba, Sakai (JP); Shoichi Suzuki, Sakai (JP); Kazunari Yokomakura, Sakai (JP); Hiroki Takahashi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/451,048

(22) Filed: Jun. 25, 2019

(65) Prior Publication Data

US 2019/0312627 A1 Oct. 10, 2019

Related U.S. Application Data

(63) Continuation of application No. 15/736,845, filed as application No. PCT/JP2016/069102 on Jun. 28, 2016, now Pat. No. 10,396,882.

(30) Foreign Application Priority Data

Jun. 29, 2015 (JP) .................................. 2015-129425

(51) Int. Cl.
*H04B 7/08* (2006.01)
*H04W 16/28* (2009.01)
(Continued)

(52) U.S. Cl.
CPC ............. *H04B 7/0805* (2013.01); *H04B 7/08* (2013.01); *H04B 7/0822* (2013.01); *H04J 11/00* (2013.01);
(Continued)

(58) Field of Classification Search
CPC ....... H04B 7/0805; H04B 7/08; H04W 28/06; H04W 16/28; H04W 88/02; H04J 11/00; H04J 2011/002; H04J 11/0069
(Continued)

(56) References Cited

U.S. PATENT DOCUMENTS

2011/0283171 A1* 11/2011 Siew ..................... H04L 1/0072
714/807
2018/0123769 A1   5/2018 Pelletier et al.

OTHER PUBLICATIONS

Aiba et al., "Terminal Device, Base Station Device, Communication Method, and Integrated Circuit", U.S. Appl. No. 15/736,845, filed Dec. 15, 2017.
(Continued)

*Primary Examiner* — Kwang B Yao
*Assistant Examiner* — Syed M Bokhari
(74) *Attorney, Agent, or Firm* — Keating & Bennett, LLP

(57) ABSTRACT

A terminal device is provided such that in a case that closed-loop UE transmit antenna selection is configured, a bit sequence is given by scrambling CRC parity bits with an RNTI and an antenna selection mask, in a case that the number of the CRC parity bits is a first value, a first transmit antenna port is given by a first antenna selection mask, and in a case that the number of the CRC parity bits is a second value, the first transmit antenna port is given by a second antenna selection mask that is different from the first antenna selection mask.

8 Claims, 14 Drawing Sheets

(51) Int. Cl.
*H04W 28/06* (2009.01)
*H04J 11/00* (2006.01)
*H04L 5/00* (2006.01)
*H04W 88/02* (2009.01)

(52) U.S. Cl.
CPC .......... *H04L 5/0044* (2013.01); *H04L 5/0053* (2013.01); *H04W 16/28* (2013.01); *H04W 28/06* (2013.01); *H04W 88/02* (2013.01); *H04J 11/0069* (2013.01); *H04J 2011/002* (2013.01)

(58) Field of Classification Search
USPC ........................................................ 370/329
See application file for complete search history.

(56) References Cited

OTHER PUBLICATIONS

Huawei Technologies Co., Ltd. et al., "pCR 45.820 NB M2M—Optimization of DCI burst structure", 3GPP TSG GERAN1 Adhoc#2 on FS_IoT_LC, GPC150176, Apr. 20-23, 2015, 11 pages.
3rd Generation Partnership Project;Technical Specification Group Radio Access Network; Evolved Universal Terrestrial Radio Access (E-UTRA); Multiplexing and channel coding (Release 12); 3GPP TS 36.212, V12.4.0, Mar. 2015, pp. 1-94.
Pelletier et al."Efficient Downlink Control With a Large Number of Carriers", U.S. Appl. No. 62/161,089, filed May 13, 2015.
Panasonic, "Consideration on search space design for ePDCCH", 3GPP TSG RAN WG1 Meeting #68bis, R1-121162, Mar. 26-30, 2012, 4 pages.

* cited by examiner

TERMINAL DEVICE, BASE STATION DEVICE, COMMUNICATION METHOD, AND INTEGRATED CIRCUIT

TECHNICAL FIELD

The present invention relates to a terminal device, a base station device, a communication method, and an integrated circuit.

This application claims priority based on Japanese Patent Application No. 2015-129425 filed on Jun. 29, 2015, the contents of which are incorporated herein by reference.

BACKGROUND ART

In the 3rd Generation Partnership Project (3GPP), a radio access method and a radio network for cellular mobile communications (hereinafter, referred to as "Long Term Evolution (LTE)," or "Evolved Universal Terrestrial Radio Access (EUTRA)") have been considered (NPL 1, NPL 2, NPL 3, NPL 4, and NPL 5). In LTE, a base station device is also referred to as an evolved NodeB (eNodeB), and a terminal device is also referred to as a User Equipment (UE). LTE is a cellular communication system in which an area is divided into a plurality of cells to form a cellular pattern, each of the cells being served by a base station device. A single base station device may manage a plurality of cells.

LTE supports a Time Division Duplex (TDD). LTE that employs a TDD scheme is also referred to as TD-LTE or LTE TDD. In TDD, uplink signals and downlink signals are time-division multiplexed. LTE supports a Frequency Division Duplex (FDD).

In 3GPP, Carrier Aggregation is specified such that a terminal device is capable of simultaneously performing transmission and/or reception on five serving cells (component carriers) at most.

Further, in the 3GPP, a configuration, in which a terminal device simultaneously performs transmission and/or reception on more than five serving cells (component carriers), is studied. Furthermore, a configuration, in which a terminal device performs transmission of a physical uplink control channel on a secondary cell that is a serving cell different from a primary cell, is studied (NPL 6).

CITATION LIST

Non-Patent Literature

NPL 1: "3GPP TS 36.211 V12.4.0 (2014-12) Evolved Universal Terrestrial Radio Access (E-UTRA); Physical channels and modulation (Release 12)", 6 Jan. 2015.

NPL 2: "3GPP TS 36.212 V12.3.0 (2014-12) Evolved Universal Terrestrial Radio Access (E-UTRA); Multiplexing and channel coding (Release 12)", 6 Jan. 2015.

NPL 3: "3GPP TS 36.213 V12.4.0 (2014-12) Evolved Universal Terrestrial Radio Access (E-UTRA); Physical layer procedures (Release 12)", 7 Jan. 2015.

NPL 4: "3GPP TS 36.321 V12.4.0 (2014-12) Evolved Universal Terrestrial Radio Access (E-UTRA); Medium Access Control (MAC) protocol specification (Release 12)", 5 Jan. 2015.

NPL 5: "3GPP TS 36.331 V12.4.1 (2014-12) Evolved Universal Terrestrial Radio Access (E-UTRA); Radio Resource Control (RRC); Protocol specification (Release 12)", 7 Jan. 2015.

NPL 6: "New WI proposal: LTE Carrier Aggregation Enhancement Beyond5 Carriers", RP-142286, Nokia Corporation, NTT DoCoMo Inc., Nokia Networks, 3GPP TSG RAN Meeting #66, Hawaii, United States of America, 8-11 Dec. 2014.

DISCLOSURE OF THE INVENTION

Problems to be Solved by the Invention

According to some aspects of the present invention, a terminal device, a base station device, a communication method, and an integrated circuit are provided such that the base station device and the terminal device are capable of efficiently communicating in a radio communication system as described above.

Means for Solving the Problems (1) In order to accomplish the object described above, according to some aspects of the present invention, the following measures are taken. That is, a terminal device according to one aspect of the present invention includes: a reception unit configured to receive a bit sequence $<c_0, \ldots, c_{A+L-1}>$; and a transmission unit configured to perform, in a case that closed-loop UE transmit antenna selection is configured, transmit antenna selection for a PUSCH, based on an antenna selection mask. In the case that the closed-loop UE transmit antenna selection is configured, the bit sequence $<c_0, \ldots, c_{A+L-1}>$ is given by scrambling CRC parity bits $<b_A, \ldots, b_{A+L-1}>$ in a bit sequence $<b_0, \ldots, b_{A+L-1}>$ with an RNTI $<x_{rnti, 0}, \ldots, x_{rnti, 15}>$ and an antenna selection mask $<x_{AS, 0}, \ldots, x_{AS, M}>$, and the bit sequence $<b_0, \ldots, b_{A+L-1}>$ is given by attaching CRC parity bits $<p_0, \ldots, p_{L-1}>$ to a DCI payload $<a_0, \ldots, a_{A-1}>$, where A is a size of the DCI payload, L is the number of the CRC parity bits, and M is the number of bits of the antenna selection mask. In a case that the L is a first value, a first antenna port is given by a first antenna selection mask $<x_{AS, 0}, \ldots, x_{AS, M}>$, and in a case that the L is a second value, the first transmit antenna port is given by a second antenna selection mask $<x_{AS, 0}, \ldots, x_{AS, M}>$, which is different from the first antenna selection mask $<x_{AS, 0}, \ldots, x_{AS, M}>$.

(2) A base station device according to one aspect of the present invention includes: a transmission unit configured to transmit a bit sequence $<c_0, \ldots, c_{A+L-1}>$; and a reception unit configured to receive, in a case that closed-loop UE transmit antenna selection is configured, a PUSCH in which transmission antenna selection is performed, based on an antenna selection mask. In the case that the closed-loop UE transmit antenna selection is configured, the bit sequence $<c_0, \ldots, c_{A+L-1}>$ is given by scrambling CRC parity bits $<b_A, \ldots, b_{A+L-1}>$ in a bit sequence $<b_0, \ldots, b_{A+L-1}>$ with an RNTI $<x_{rnti, 0}, \ldots, x_{rnti, 15}>$ and an antenna selection mask $<x_{AS, 0}, \ldots, x_{AS, M}>$, and the bit sequence $<b_0, \ldots, b_{A+L-1}>$ is given by attaching CRC parity bits $<p_0, \ldots, p_{L-1}>$ to a DCI payload $<a_0, \ldots, a_{A-1}>$, where A is a size of the DCI payload, L is the number of the CRC parity bits, and M is the number of bits of the antenna selection mask. In a case that the L is a first value, a first transmit antenna port is given by a first antenna selection mask $<x_{AS, 0}, \ldots, x_{AS, M}>$, and in a case that the L is a second value, the first transmit antenna port is given by a second antenna selection mask $<x_{AS, 0}, \ldots, x_{AS, M}>$, which is different from the first antenna selection mask $<x_{AS, 0}, \ldots, x_{AS, M}>$.

(3) A communication method according to one aspect of the present invention is a communication method of a terminal device, includes the steps of: receiving a bit sequence $<c_0, \ldots, c_{A+L-1}>$; and executing, in a case that closed-loop UE transmit antenna selection is configured, transmit antenna selection for a PUSCH, based on an antenna selection mask. In the case that the closed-loop UE transmit antenna selection is configured, the bit sequence $<c_0, \ldots, c_{A+L-1}>$ is given by scrambling CRC parity bits $<b_A, \ldots, b_{A+L-1}>$ in a bit sequence $<b_0, \ldots, b_{A+L-1}>$ with an RNTI $<x_{rnti, 0}, \ldots, x_{rnti, 15}>$ and an antenna selection mask $<x_{AS, 0}, \ldots, x_{AS, M}>$, and the bit sequence $<b_0, \ldots, b_{A+L-1}>$ is given by attaching CRC parity bits $<p_0, \ldots, p_{L-1}>$ to a DCI payload $<a_0, \ldots, a_{A-1}>$, where A is a size of the DCI payload, L is the number of the CRC parity bits, and M is the number of bits of the antenna selection mask. In a case that the L is a first value, a first transmit antenna port is given by a first antenna selection mask $<x_{AS, 0}, \ldots, x_{AS, M}>$, and in a case that the L is a second value, the first transmit antenna port is given by a second antenna selection mask $x_{AS, 0}, \ldots, x_{AS, M}>$, which is different from the first antenna selection mask $<x_{AS, 0}, \ldots, x_{AS, M}>$.

(4) A communication method according to one aspect of the present invention is a communication method of a base station, includes the steps of: transmitting a bit sequence $<c_0, \ldots, c_{A+L-1}>$; and receiving, in a case that closed-loop UE transmit antenna selection is configured, a PUSCH in which transmission antenna selection is performed, based on an antenna selection mask. In the case that the closed-loop UE transmit antenna selection is configured, the bit sequence $<c_0, \ldots, c_{A+L-1}>$ is given by scrambling CRC parity bits $<b_A, \ldots, b_{A+L-1}>$ in a bit sequence $<b_0, \ldots, b_{A+L-1}>$ with an RNTI $<x_{rnti, 0}, \ldots, x_{rnti, 15}>$ and an antenna selection mask $<x_{AS, 0}, \ldots, x_{AS, M}>$, and the bit sequence $<b_0, \ldots, b_{A+L-1}>$ is given by attaching CRC parity bits $<p_0, \ldots, p_{L-1}>$ to a DCI payload $<a_0, \ldots, a_{A-1}>$, where A is a size of the DCI payload, L is the number of the CRC parity bits, M is the number of bits of the antenna selection mask. In a case that the L is a first value, a first transmit antenna port is given by a first antenna selection mask $<x_{AS, 0}, \ldots, x_{AS, M}>$, and in a case that the L is a second value, the first transmit antenna port is given by a second antenna selection mask $<x_{AS, 0}, \ldots, x_{AS, M}>$, which is different from the first antenna selection mask $<x_{AS, 0}, \ldots, x_{AS, M}>$.

(5) An integrated circuit according to one aspect of the present invention is mounted in the terminal device. The integrated circuit causes the terminal device to achieve the functions of: receiving a bit sequence $<c_0, \ldots, c_{A+L-1}>$; and performing, in a case that closed-loop UE transmit antenna selection is configured, transmit antenna selection for a PUSCH, based on an antenna selection mask. In the case that the closed-loop UE transmit antenna selection is configured, the bit sequence $<c_0, \ldots, c_{A+L-1}>$ is given by scrambling CRC parity bits $<b_A, \ldots, b_{A+L-1}>$ in a bit sequence $<b_0, \ldots, b_{A+L-1}>$ with an RNTI $<x_{rnti, 0}, \ldots, x_{rnti, 15}>$ and an antenna selection mask $<x_{AS, 0}, \ldots, x_{AS, M}>$, and the bit sequence $<b_0, \ldots, b_{A+L-1}>$ is given by attaching CRC parity bits $<p_0, \ldots, p_{L-1}>$ to a DCI payload $<a_0, \ldots, a_{A-1}>$, where A is a size of the DCI payload, L is the number of the CRC parity bits, and M is the number of bits of the antenna selection mask. In a case that the L is a first value, a first transmit antenna port is given by a first antenna selection mask $<x_{AS, 0}, \ldots, x_{AS, M}>$, and in a case that the L is a second value, the first transmit antenna port is given by a second antenna selection mask $<x_{AS, 0}, \ldots, x_{AS, M}>$, which is different from the first antenna selection mask $<x_{AS, 0}, \ldots, x_{AS, M}>$.

(6) An integrated circuit according to one aspect of the present invention is an integrated circuit mounted in a base station device. The integrated circuit causes the base station device to achieve the functions of: transmitting a bit sequence $<c_0, \ldots, c_{A+L-1}>$; and receiving, in a case that closed-loop UE transmit antenna selection is configured, a PUSCH in which transmit antenna selection is performed based on an antenna selection mask. In the case that the closed-loop UE transmit antenna selection is configured, the bit sequence $<c_0, \ldots, c_{A+L-1}>$ is given by scrambling CRC parity bits $<b_A, \ldots, b_{A+L-1}>$ in a bit sequence $<b_0, \ldots, b_{A+L-1}>$ with an RNTI $<x_{rnti, 0}, \ldots, x_{rnti, 15}>$ and an antenna selection mask $<x_{AS, 0}, \ldots, x_{AS, M}>$, and the bit sequence $<b_0, \ldots, b_{A+L-1}>$ is given by attaching CRC parity bits $<p_0, \ldots, p_{L-1}>$ to a DCI payload $<a_0, \ldots, a_{A-1}>$, where A is a size of the DCI payload, L is the number of the CRC parity bits, and M is the number of bits of the antenna selection mask. In a case that the L is a first value, a first transmit antenna port is given by a first antenna selection mask $<x_{AS, 0}, \ldots, x_{AS, M}>$, and in a case that the L is a second value, the first transmit antenna port is given by a second antenna selection mask $<x_{AS, 0}, \ldots, x_{AS, M}>$, which is different from the first antenna selection mask $<x_{AS, 0}, \ldots, x_{AS, M}>$.

Effects of the Invention

According to some aspects of the present invention, a base station device and a terminal device are capable of communicating efficiently.

MODE FOR CARRYING OUT THE INVENTION

Embodiments of the present invention will be described below.

Figure 1:
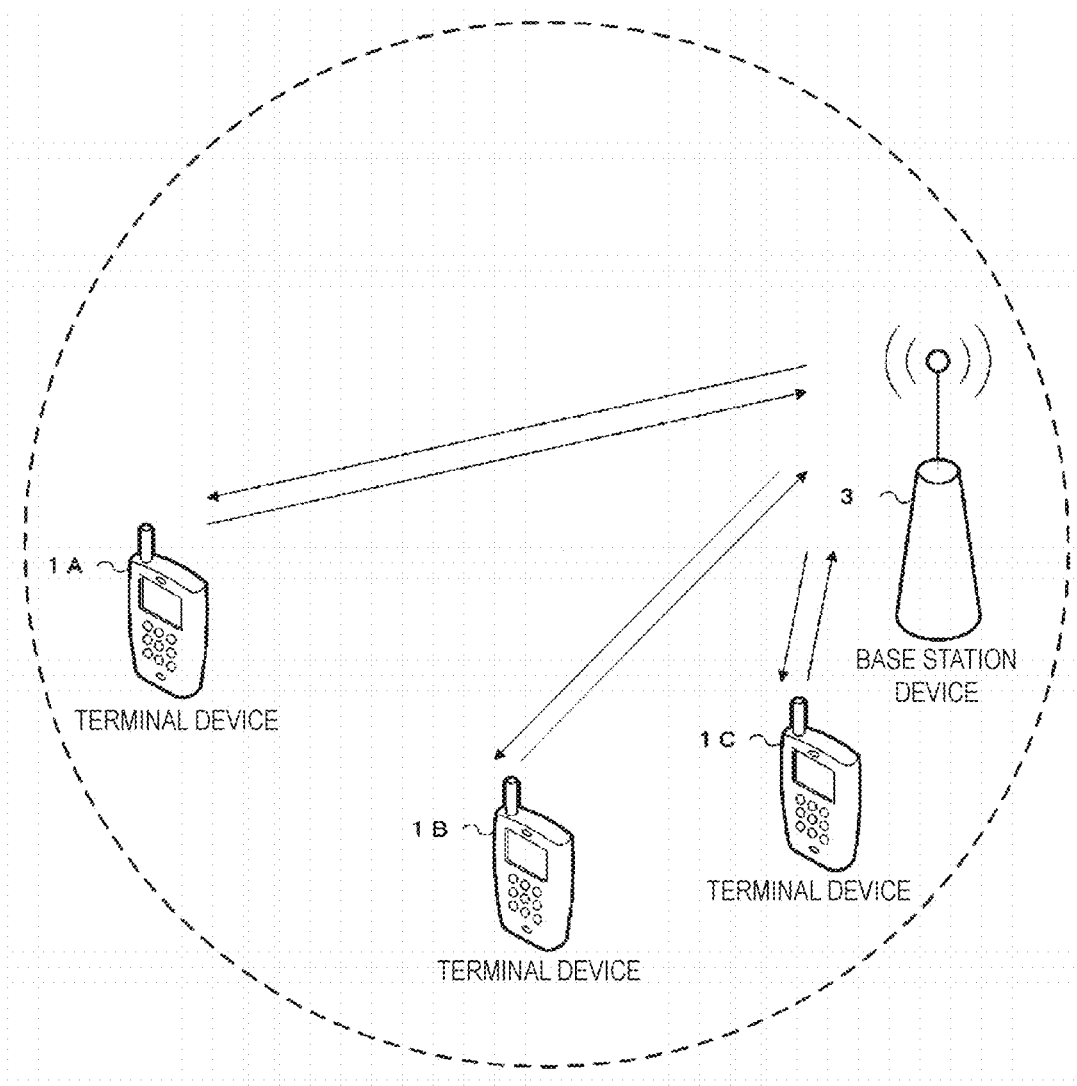
FIG. 1 is a diagram illustrating a concept of a radio communication system in the present embodiment.

FIG. 1 is a conceptual diagram of a radio communication system in the present embodiment. In FIG. 1, the radio communication system includes terminal devices 1A to 1C and a base station device 3. Hereinafter, the terminal devices 1A to 1C are each referred to as a terminal device 1.

Physical channels and physical signals in the present embodiment will be described.

In FIG. 1, in uplink radio communication from the terminal device 1 to the base station device 3, the following uplink physical channels are used. Here, the uplink physical channels are used to transmit information output from higher layers.

Physical Uplink Control CHannel (PUCCH)
Physical Uplink Shared CHannel (PUSCH)
Physical Random Access CHannel (PRACH)

The PUCCH is used to transmit Uplink Control Information (UCI). Here, the uplink control information may include Channel State Information (CSI) used to indicate a downlink channel state. The uplink control information may include Scheduling Request (SR) used to request an UL-SCH resource. The uplink control information may include a Hybrid Automatic Repeat reQuest ACKnowledgement (HARQ-ACK). HARQ-ACK may indicate HARQ-ACK for downlink data (transport block, Medium Access Control Protocol Data Unit (MAC PDU), DownLink-Shared CHannel (DL-SCH), or Physical Downlink Shared CHannel (PDSCH)).

In other words, HARQ-ACK may indicate ACKnowledgement (ACK) or Negative-ACKnowledgement (NACK). Here, HARQ-ACK may also be referred to as ACK/NACK, HARQ feedback, HARQ acknowledgement, HARQ information, or HARQ control information.

The PUSCH is used to transmit uplink data (UpLink-Shared CHannel (UL-SCH)). Furthermore, the PUSCH may be used to transmit HARQ-ACK and/or CSI along with the uplink data. Furthermore, the PUSCH may be used to transmit CSI only or HARQ-ACK and CSI only. In other words, the PUSCH may be used to transmit the uplink control information only.

Here, the base station device 3 and the terminal device 1 communicate signals in (transmit and receive signals to and from) higher layers. For example, the base station device 3 and the terminal device 1 may transmit and receive Radio Resource Control (RRC) signaling (also referred to as a RRC message, RRC information) in an RRC layer. The base station device 3 and the terminal device 1 may transmit and receive a Medium Access Control (MAC) control element in a MAC layer. Here, the RRC signaling and/or MAC control element is also referred to as higher layer signaling.

The PUSCH may be used to transmit the RRC signaling and the MAC control element. Here, the RRC signaling transmitted from the base station device 3 may be signaling common to a plurality of terminal devices 1 in a cell. The RRC signaling transmitted from the base station device 3 may be signaling dedicated to a certain terminal device 1 (also referred to as dedicated signaling). In other words, user-equipment-specific information (information unique to user equipment) may be transmitted through signaling special for the certain terminal device 1.

The PRACH is used to transmit a random access preamble. The PRACH may be used for an initial connection establishment procedure, a handover procedure, a connection re-establishment procedure, and uplink transmission synchronization (timing adjustment), and may also be used for indicating a PUCCH resource request.

In FIG. 1, the following uplink physical signal is used in the uplink radio communication. Here, the uplink physical signal is not used to transmit information output from higher layers, but is used by a physical layer.

UpLink Reference Signal (UL RS)

According to the present embodiment, the following two types of uplink reference signals are used.

Demodulation Reference Signal (DMRS)
Sounding Reference Signal (SRS)

The DMRS is associated with transmission of the PUSCH or the PUCCH. The DMRS is time-multiplexed with the PUSCH or the PUCCH. The base station device 3 uses the DMRS to perform channel compensation of the PUSCH or the PUCCH. Hereinafter, transmission of both the PUSCH and the DMRS is simply referred to as transmission of the PUSCH. hereinafter, transmission of both the PUCCH and the DMRS is simply referred to as transmission of the PUCCH.

The SRS has no association with the transmission of the PUSCH or the PUCCH. The base station device 3 uses the SRS to measure an uplink channel state.

In FIG. 1, the following downlink physical channels are used for downlink radio communication from the base station device 3 to the terminal device 1. Here, the downlink physical channel is used to transmit the information output from higher layers.

Physical Broadcast CHannel (PBCH)
Physical Control Format Indicator CHannel (PCFICH)
Physical Hybrid automatic repeat request Indicator CHannel (PHICH)
Physical Downlink Control CHannel (PDCCH)
Enhanced Physical Downlink Control CHannel (EPDCCH)
Physical Downlink Shared CHannel (PDSCH)
Physical Multicast CHannel (PMCH)

The PBCH is used to broadcast a Master Information Block (MIB), or a Broadcast CHannel (BCH), that is shared by the terminal devices 1.

The PCFICH is used to transmit information indicating a region (OFDM symbols) to be used for transmission of the PDCCH.

The PHICH is used to transmit an HARQ indicator (HARQ feedback or response information) indicating an ACKnowledgement (ACK) or a Negative ACKnowledgement (NACK) with respect to the uplink data (UpLink Shared CHannel (UL-SCH)) received by the base station device 3.

The PDCCH and the EPDCCH are used to transmit Downlink Control Information (DCI). Here, a plurality of DCI formats are defined for transmission of the downlink control information. In other words, a field for the downlink control information is defined in a DCI format and is mapped to information bits.

For example, DCI formats for downlink (for example, DCI format 1A and DCI format 1C) to be used for scheduling one PDSCH in one cell (transmission of a single downlink transport block) may be defined.

Here, each of the downlink DCI formats includes information on the scheduling of the PDSCH. For example, the downlink DCI format includes downlink control information such as a Carrier Indicator Field (CIF), information on resource block assignment, or information on a Modulation and Coding Scheme (MCS). Here, the downlink DCI format is also referred to as a downlink grant or a downlink assignment.

Furthermore, for example, DCI formats for uplink (for example, a DCI format 0 and a DCI format 4) to be used for scheduling one PUSCH in one cell (transmission of a single uplink transport block) are defined.

Here, each of the uplink DCI formats includes information on the scheduling of the PUSCH. For example, the uplink DCI format includes downlink control information such as a Carrier Indicator Field (CIF), information on resource block assignment and/or hopping resource allocation, information on Modulation and coding scheme (MCS) and/or redundancy version, or information used for indicating the number of transmission layers (precoding information and the number of layers). Here, the uplink DCI format is also referred to as the uplink grant or the uplink assignment.

In a case that a PDSCH resource is scheduled in accordance with the downlink assignment, the terminal device 1 may receive downlink data on the scheduled PDSCH. In a case that a PUSCH resource is scheduled in accordance with the uplink grant, the terminal device 1 may transmit uplink data and/or uplink control information on the scheduled PUSCH.

Here, the terminal device 1 may monitor a set of PDCCH candidates and/or EPDCCH candidates. The PDCCH may indicate a PDCCH and/or an EPDDCH below. That is, in the present embodiment, the PDCCH and the EPDCCH are also collectively referred to as simply a PDCCH. Furthermore, in the present embodiment, the PDCCH candidates and the EPDCCH candidates are also collectively referred to as simply PDCCH candidates.

Here, the PDCCH candidates represent candidates, to which the PDCCH can be mapped and/or to which the PDCCH can be transmitted by the base station device 3. Furthermore "monitor" may include the meaning that the terminal device 1 attempts to decode each PDCCH in a set of PDCCH candidates in accordance with each of all the monitored DCI formats. The set of PDCCH candidates to be monitored by the terminal device 1 and/or the set of EPDCCH candidates to be monitored by the terminal device 1 are also referred to as a search space.

Here, the search space may include a Common Search Space (CSS). For example, the CSS may be defined as a space common to a plurality of terminal devices 1. Furthermore, the search space may include a UE-specific Search Space (USS). For example, the USS may be given by at least a Cell-Radio Network Temporary Identifier (C-RNTI) assigned to the terminal device 1 (may be defined based on the C-RNTI). For example, the USS may be given by at least a Temporary C-RNTI assigned to the terminal device 1 (may be defined based on the Temporary C-RNTI).

That is, the terminal device 1 may monitor PDCCHs in CSS and/or USS to detect a PDCCH addressed to the terminal device 1. Furthermore, the terminal device 1 may monitor EPDCCHs in CSS and/or USS to detect an EPDCCH addressed to the terminal device 1.

Here, an RNTI assigned by the base station device 3 to the terminal device 1 is utilized for the transmission of downlink control information (transmission on the PDCCH). Specifically, Cyclic Redundancy Check (CRC) parity bits are attached to a Downlink Control Information (DCI) format, and after the attachment, the CRC parity bits are scrambled with the RNTI. Here, the CRC parity bits attached to the DCI format may be obtained from a payload of the corresponding DCI format.

That is, the terminal device 1 attempts to decode the DCI format to which the CRC parity bits scrambled with the RNTI have been attached, and detects, as a DCI format addressed to the terminal device 1, the DCI format for which the CRC has been successful (also referred to as blind coding). In other words, the terminal device 1 may detect the PDCCH with the CRC scrambled with the RNTI. The terminal device 1 may detect the PDCCH including the DCI format, to which the CRC parity bits scrambled with the RNTI have been attached.

Here, the RNTI may include a Cell-Radio Network Temporary Identifier (C-RNTI). The C-RNTI is an identifier unique to the terminal device 1 to be used for identifying an RRC connection and scheduling. Furthermore, the C-RNTI may be utilized for dynamically scheduled unicast transmission.

Moreover, the RNTI may further include a Semi-Persistent Scheduling C-RNTI (SPS C-RNTI). Here, the SPS C-RNTI serves as an identifier unique to the terminal device 1 to be used for semi-persistent scheduling. Further, the SPS C-RNTI may be utilized for semi-persistently scheduled unicast transmission.

The RNTI further may include a Temporary C-RNTI. Here, the Temporary C-RNTI is an identifier unique to a preamble that has been transmitted by the terminal device 1 and that is to be used in a contention based random access procedure. Furthermore, the Temporary C-RNTI may be utilized for dynamically scheduled transmission.

The PDSCH is used to transmit downlink data (DownLink Shared CHannel (DL-SCH)). Furthermore, the PDSCH is used to transmit a system information message. Here, the system information message may be cell-specific information (information unique to a cell). The system information is included in RRC signaling. The PDSCH is used to transmit the RRC signaling and the MAC control element.

The PMCH is used to transmit multicast data (Multicast CHannel (MCH)).

In FIG. 1, the following downlink physical signals are used in the downlink radio communication. Here, the downlink physical signals are not used to transmit the information output from the higher layers, but are used by the physical layer.

Synchronization Signal (SS)
DownLink Reference Signal (DL RS)

The synchronization signal is used for the terminal device 1 to be synchronized in frequency and time domains in downlink. In the TDD scheme, the synchronization signal is mapped to subframes 0, 1, 5, and 6 in a radio frame. In the FDD scheme, the synchronization signal is mapped to subframes 0 and 5 in the radio frame.

The downlink reference signal is used for the terminal device 1 to perform the channel compensation of the downlink physical channel. Here, the downlink reference signal is used for the terminal device 1 to obtain the downlink channel state information.

In the present embodiment, the following five types of downlink reference signals are used.

Cell-specific Reference Signal (CRS)
UE-specific Reference Signal (URS) associated with the PDSCH
Demodulation Reference Signal (DMRS) associated with the EPDCCH
Non-Zero Power Channel State Information-Reference Signal (NZP CSI-RS)
Zero Power Channel State Information-Reference Signal (ZP CSI-RS)
Multimedia Broadcast and Multicast Service over Single Frequency Network Reference Signal (MBSFN RS)
Positioning Reference Signal (PRS)

Here, the downlink physical channel and the downlink physical signal are collectively referred to as a downlink signal. The uplink physical channel and the uplink physical signal are collectively referred to as an uplink signal. The downlink physical channel and the uplink physical channel are collectively referred to as a physical channel. The downlink physical signal and the uplink physical signal are collectively referred to as a physical signal.

The BCH, the MCH, the UL-SCH, and the DL-SCH are transport channels. A channel used in a Medium Access Control (MAC) layer is referred to as a transport channel. The unit of the transport channel used in the MAC layer is referred to as a Transport Block (TB) or a MAC Protocol Data Unit (PDU). Control of a Hybrid Automatic Repeat reQuest (HARM) is performed for each transport block in the MAC layer. The transport block is a unit of data that is delivered by the MAC layer to the physical layer. In the physical layer, the transport block is mapped to a codeword, and coding processing is performed for each codeword.

Hereinafter, the carrier aggregation will be described.

In the present embodiment, one or more serving cells may be configured for the terminal device 1. A technology, by which the terminal device 1 communicates via a plurality of serving cells, is referred to as a cell aggregation or carrier aggregation.

Here, the present embodiment may be applicable to one serving cell or each of the plurality of serving cells configured for the terminal device 1. Alternatively, the present embodiment may be applicable to one or more serving cells configured for the terminal device 1. Alternatively, the present embodiment may be applicable to one serving cell or each of a plurality of serving cell groups (for example, PUCCH cell groups or timing advance groups) configured for the terminal device 1, as will be described later. Alternatively, the present embodiment may be applicable to one or more serving cell groups configured for the terminal device 1.

Furthermore, in the present embodiment, Time Division Duplex (TDD) and/or Frequency Division Duplex (FDD) may be applicable. Here, in a case of carrier aggregation, TDD or FDD may be applicable to one or all serving cells. In another case of carrier aggregation, serving cells to which the TDD is applied and serving cells to which the FDD is applied may be aggregated. Here, a frame structure corresponding to the FDD is also referred to as a frame structure type 1. Additionally, a frame structure corresponding to the TDD is also referred to as a frame structure type 2.

Here, one or more configured serving cells include one primary cell and one or more secondary cells. The primary cell may be a serving cell, on which an initial connection establishment procedure has been performed, a serving cell in which a connection re-establishment procedure has started, or a cell indicated as a primary cell during a handover procedure. At a point of time when an RRC connection is established, or subsequently, a secondary cell may be configured.

Here, a carrier corresponding to a serving cell in the downlink is referred to as a downlink component carrier. A carrier corresponding to a serving cell in the uplink is referred to as an uplink component carrier. The downlink component carrier and the uplink component carrier are collectively referred to as a component carrier.

The terminal device 1 may simultaneously perform transmission and/or reception on a plurality of physical channels in one or more serving cells (component carrier(s)). Here, transmission of one physical channel may be performed in one serving cell (component carrier) of the plurality of serving cells (component carriers).

Here, the primary cell is used to transmit the PUCCH. The primary cell cannot be deactivated. Cross-carrier scheduling does not apply to primary cell. In other words, the primary cell is always scheduled via its PDCCH.

In a case that PDCCH (PDCCH monitoring) of a secondary cell is configured, cross-carries scheduling may not apply this secondary cell. To be specific, in this case, the secondary cell may always be scheduled via its PDCCH on the secondary cell. In a case that no PDCCH (PDCCH monitoring) of a secondary cell is configured, cross-carriers scheduling applies to the secondary cell, and the secondary cell may always be scheduled via the PDCCH in another serving cell.

Here, in the present embodiment, a secondary cell used to transmit the PUCCH is referred to as a PUCCH secondary cell or a special secondary cell. Further, a secondary cell not used to transmit the PUCCH is referred to as a non-PUCCH secondary cell, a non-special secondary cell, a non-PUCCH serving cell, or a non-PUCCH cell. The primary cell and the PUCCH secondary cell are collectively referred to as a PUCCH serving cell and a PUCCH cell.

Here, a PUCCH serving cell (primary cell, PUCCH secondary cell) always has a downlink component carrier and an uplink component carrier. A PUCCH resource is configured in the PUCCH serving cell (primary cell, PUCCH secondary cell).

The non-PUCCH serving cell (non-PUCCH secondary cell) may have the downlink component carrier only. The non-PUCCH serving cell (non-PUCCH secondary cell) may have the downlink component carrier and the uplink component carrier.

The terminal device 1 may perform PUCCH transmission on the PUCCH serving cell. In other words, the terminal device 1 may perform PUCCH transmission on the primary cell. Moreover, the terminal device 1 may perform PUCCH transmission on the PUCCH secondary cell. The terminal device 1 does not perform transmission on the PUCCH in the non-special secondary cell.

Here, the PUCCH secondary cell may be defined as a serving cell that is neither a primary cell nor a secondary cell.

Here, the base station device 3 may configure one or more serving cells through higher layer signaling. For example, one or more secondary cells may be configured to form a set of the plurality of serving cells with a primary cell. Here, the serving cells configured by the base station device 3 may include a PUCCH secondary cell.

That is, the PUCCH secondary cell may be configured by the base station device 3. For example, the base station device 3 may transmit the higher layer signaling that includes information (an index) used to configure the PUCCH secondary cell.

Figure 2A:
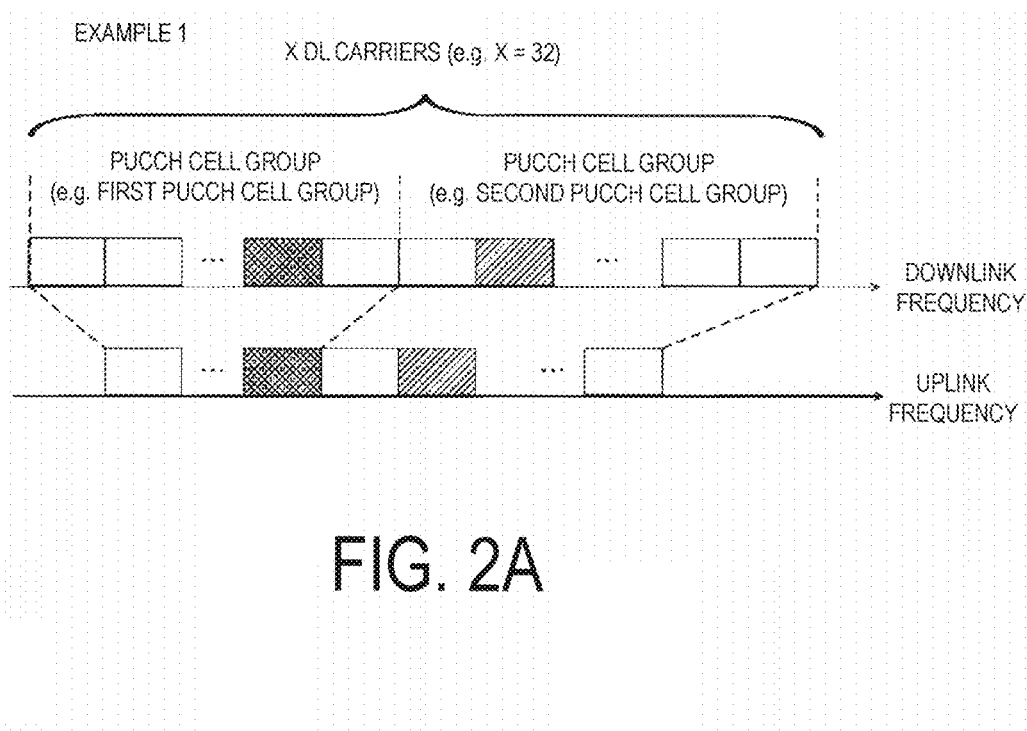
FIG. 2A is a first diagram illustrating a cell group in the present embodiment.
Figure 2B:
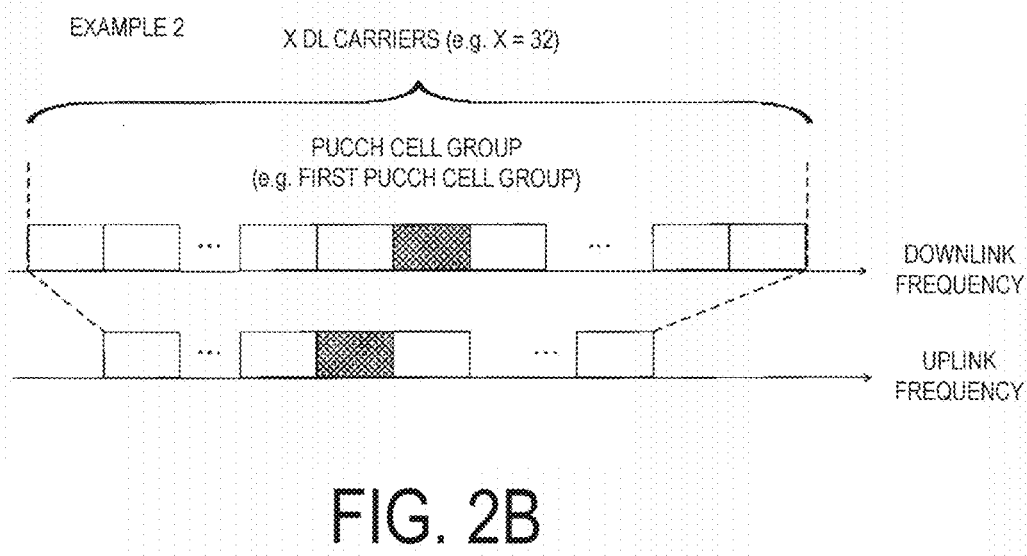
FIG. 2B is a second diagram illustrating a cell group in the present embodiment.
Figure 2C:
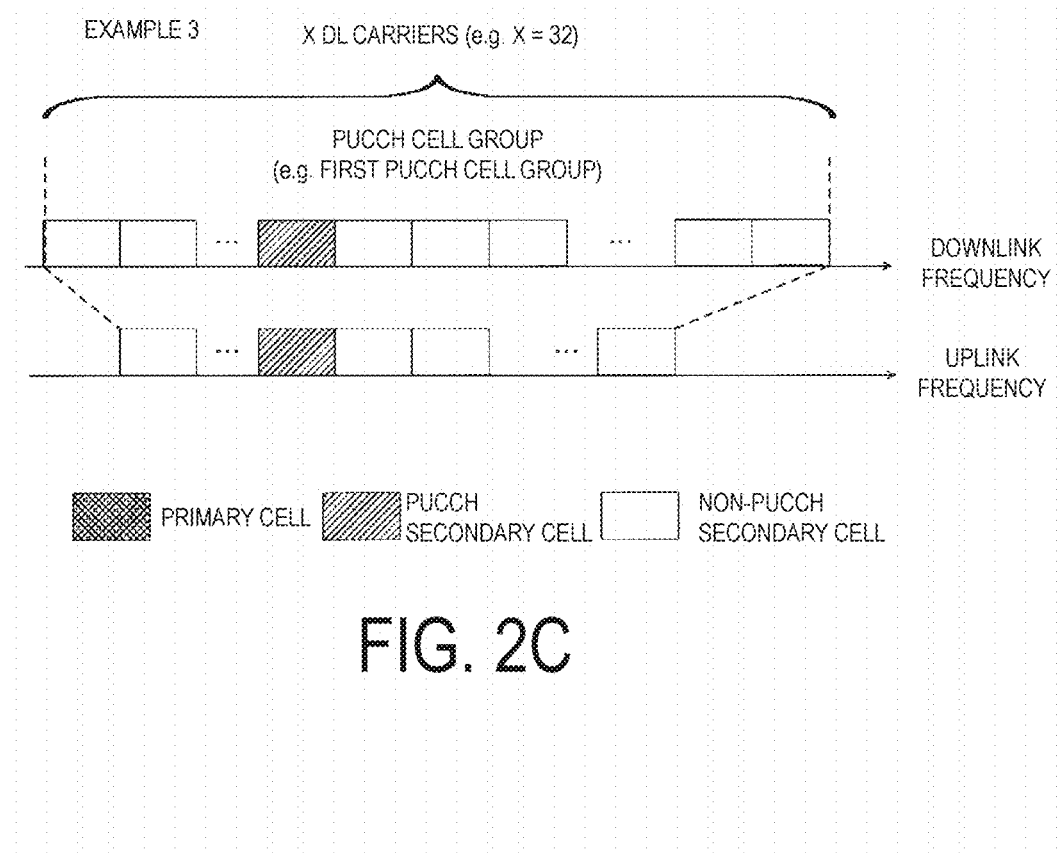
FIG. 2C is a third diagram illustrating a cell group in the present embodiment.

FIGS. 2A to 2C are diagrams illustrating a cell group in the present embodiment. FIGS. 2A to 2C respectively illustrate three examples (Example 1, Example 2, and Example 3) as examples of a configuration (constitution and definition) of the PUCCH cell group. Here, in the present embodiment, one or more serving cell groups are referred to as a PUCCH cell group. The PUCCH cell group may be a group associated with transmission on the PUCCH (transmission of the uplink control information on the PUCCH). Here, a certain serving cell belongs to any one of PUCCH cell groups. Here, it is needless to say that the PUCCH cell group may be configured differently from the examples illustrated in FIGS. 2A to 2C.

Here, the PUCCH cell group may be configured by the base station device 3. For example, the base station device 3 may transmit the higher layer signaling that includes information (an index or a cell group index) used to configure the PUCCH cell group.

Here, it is needless to say that the present embodiment can apply to one or more serving cell groups rather than the above-described PUCCH cell group. For example, the base station device 3 may configure one or more serving cell groups corresponding to a serving cell indicated by using a carrier indicator field (CIF) Further, as described later, the base station device 3 may configure a timing advance group including one or more serving cells, for example.

That is, the base station device 3 may configure one or more serving cell groups by being associated with uplink transmission. The base station device 3 may also configure one or more serving cell groups by being associated with downlink transmission.

Hereinafter, one or more serving cell groups configured by the base station device 3 are also referred to as a cell group. That is, the PUCCH cell group may be included in the cell group. Furthermore, the timing advance group may be included in the cell group. Here, the base station device 3 and/or the terminal device 1 may perform operations described in the present embodiment in each cell group. That is, the base station device 3 and/or the terminal device 1 may perform the operations described in the present embodiment in one cell group.

Here, the base station device 3 and/or the terminal device 1 may support carrier aggregation of up to 32 downlink component carriers (downlink cells), for example. In other words, the base station device 3 and/or the terminal device 1 are simultaneously capable of performing transmission and/or reception of a plurality of physical channels on up to 32 serving cells. That is, the base station device 3 may configure up to 32 serving cells for the terminal device 1. Here, the number of uplink component carriers may be less than the number of downlink component carriers.

Furthermore, the base station device 3 and/or the terminal device 1 may support carrier aggregation of up to five downlink component carriers, for example. In other words, the base station device 3 and/or the terminal device 1 are simultaneously capable of performing transmission and/or reception on the plurality of physical channels in up to five serving cells. That is, the base station device 3 may configure up to five serving cells for the terminal device 1. Here, the number of uplink component carriers may be less than the number of downlink component carriers.

FIG. 2A illustrates a configuration where a first cell group and a second cell group are configured as cell groups (PUCCH cell groups, here). For example, in FIG. 2A, the base station device 3 may transmit a downlink signal in the first cell group. Furthermore, the terminal device 3 may transmit an uplink signal in the first cell group (may transmit uplink control information on the PUCCH in the first cell group).

For example, in a case that 20 serving cells (downlink component carriers or downlink cells) are configured or activated in the first cell group, the base station device 3 and the terminal device 1 may transmit and receive the uplink control information for the 20 downlink component carriers to and from each other.

To be specific, the terminal device 1 may transmit HARQ-ACK for the 20 downlink component carriers (HARQ-ACK for transmission on the PDSCH and HARQ-ACK for transport blocks). Furthermore, the terminal device 1 may transmit CSI corresponding to each of the 20 downlink component carriers. Moreover, the terminal device 1 may transmit the SR for each cell group. Similarly, the base station device 3 and the terminal device 1 may transmit and receive uplink control information to and from each other in the second cell group.

Similarly, the base station device 3 and the terminal device 1 may configure a cell group as illustrated in FIG. 2B, and transmit and receive uplink control information to and from each other. Further, the base station device 3 and the terminal device 1 may configure the cell group as illustrated in FIG. 2C and transmit and receive the uplink control information to and from each other.

Here, one cell group (for example, a PUCCH cell group) may include at least one serving cell (for example, a PUCCH serving cell). Further, one cell group (for example, a PUCCH cell group) may only include one serving cell (for example, only the PUCCH serving cell). Furthermore, one PUCCH cell group may include one PUCCH serving cell and one or more non-PUCCH serving cells, for example.

Here, a cell group including a primary cell is referred to as a primary cell group. A cell group not including a primary cell is referred to as a secondary cell group. A PUCCH cell group including a primary cell is referred to as a primary PUCCH cell group. The PUCCH cell group not including a primary cell is referred to as a secondary PUCCH cell group.

In other words, the secondary PUCCH cell group may include a PUCCH secondary cell. For example, an index for the primary PUCCH cell group may always be defined as 0. An index for the secondary PUCCH cell group may be configured by the base station device 3 (or a network device).

Here, the base station device 3 may transmit information used to indicate the PUCCH secondary cell with the information included in higher layer signaling and/or PDCCH (downlink control information transmitted on the PDCCH). The terminal device 1 may determine a PUCCH secondary cell in accordance with information used to indicate the PUCCH secondary cell. Here, a cell index of the PUCCH secondary cell may be prescribed according to the specifications and the like.

As described above, the PUCCH on the PUCCH serving cell may be used to transmit the uplink control information (HARQ-ACK, CSI (e.g., periodic CSI) and/or SR) to a serving cell (a PUCCH serving cell, a non-PUCCH serving cell) included in the PUCCH cell group, to which such a PUCCH serving cell belongs.

In other words, uplink control information (HARQ-ACK, CSI (for example, periodic CSI), and/or SR) for the serving cells (the PUCCH serving cell and the non-PUCCH serving cell) included in the PUCCH cell group is transmitted on the PUCCH in the PUCCH serving cell included in the PUCCH cell group.

Here, the present embodiment may be applied only to transmission of HARQ-ACK. Alternatively, the present embodiment may be applied only to transmission of CSI (for example, periodic CSI). Alternatively, the present embodiment may be applied only to transmission of SR. Alternatively, the present embodiment may be applied to transmission of HARQ-ACK, transmission of CSI (for example, periodic CSI), and/or transmission of SR.

In other words, a cell group (or PUCCH cell group) for HARQ-ACK transmission may be configured. A cell group (or PUCCH cell group) for CSI (for example, periodic CSI) transmission may be configured. A cell group (or PUCCH cell group) for SR transmission may be configured.

For example, a cell group for the HARQ-ACK transmission, a cell group for the CSI (for example, periodic CSI) transmission, and/or a cell group for the SR transmission may be configured individually. Alternatively, a common cell group may be configured as a cell group for the HARQ-ACK transmission, a cell group for the CSI (for example, periodic CSI) transmission, and/or a cell group for the SR transmission.

Here, one or more cell groups may be configured for the HARQ-ACK transmission. One or two cell groups for the CSI transmission may be configured. One or two cell groups for the SR transmission may be configured. Furthermore, a cell group for transmission of CSI (for example, periodic CSI) and/or a cell group for transmission of SR does not need to be configured (defined).

Hereinafter, Multiple Timing Advance (MTA) in the present embodiment will be described.

For example, the base station device 3 may configure a plurality of timing advance groups for the terminal device 1 that supports the MTA. A timing advance group may include one or more serving cells. Here, the timing advance group including the primary cell is referred to as a primary timing advance group. Furthermore, the timing advance group that does not include the primary cell is referred to as a secondary timing advance group.

That is, such a secondary timing advance group may only include one or more secondary cells. Here, a PUCCH secondary cell may be included in any one of the primary timing advance group or the secondary timing advance group.

Furthermore, in the terminal device 1, an uplink transmission timing in the primary timing advance group and for an uplink transmission timing in the secondary timing advance group may be individually controlled. For example, in the terminal device 1, an uplink transmission timing for the PUCCH, the PUSCH, and/or the SRS in the primary timing advance group, and an uplink transmission timing for the PUCCH, the PUSCH, and/or the SRS in the secondary timing advance group may be individually controlled. Hereinafter, the uplink transmission timing may be an uplink transmission timing for the PUCCH, PUSCH, and/or SRS.

Here, an uplink transmission timing in a secondary cell that belongs to the primary timing advance group may be the same as an uplink transmission timing in the primary cell. That is, in a case of receiving a timing advance command for the primary cell from the base station device 3, the terminal device 1 may adjust an uplink transmission timing in a secondary cell that belongs to the primary cell and/or the primary timing advance group, by referring to the timing advance command for the primary cell.

Furthermore, in a case of receiving a timing advance command for the secondary timing advance group from the base station device 3, the terminal device 1 may adjust an uplink transmission timing in a secondary cell (or all secondary cells) that belongs to the secondary timing advance group, by referring to the timing advance command for the secondary timing advance group. The same uplink transmission timing may be applied to all secondary cells that belong to the secondary timing advance group.

Hereinafter, a configuration of a slot in the present embodiment will be described.

Figure 3:
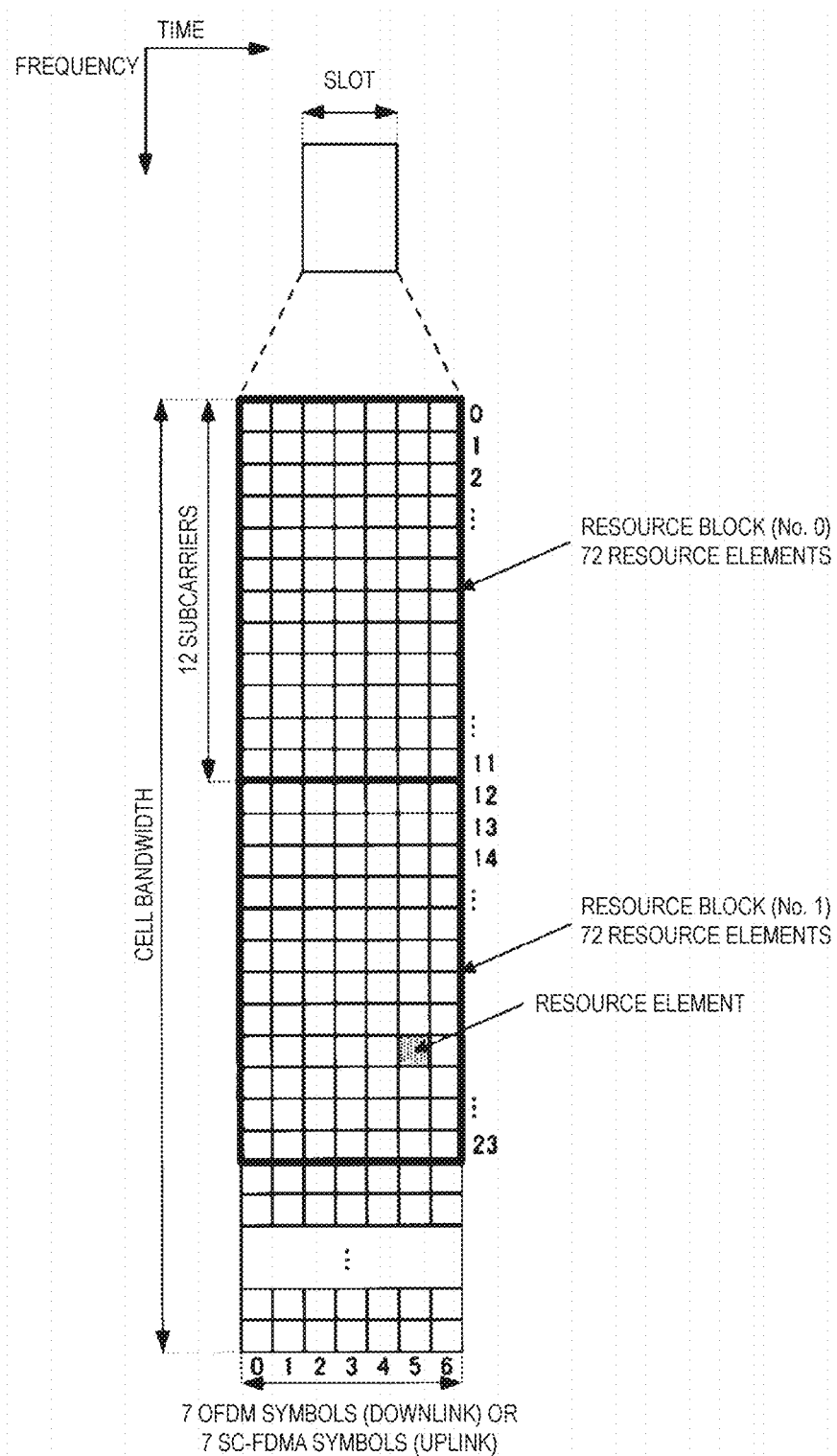
FIG. 3 is a diagram illustrating a configuration of a slot in the present embodiment.

FIG. 3 is a diagram illustrating the configuration of the slot in the present embodiment. In FIG. 3, the horizontal axis represents a time axis, and the vertical axis represents a frequency axis. Here, a normal Cyclic Prefix (CP) may be applicable to an OFDM symbol. Alternatively, an extended Cyclic Prefix (CP) may be applicable to the OFDM symbol. Furthermore, the physical signal or the physical channel transmitted in each of the slots is represented by a resource grid.

In downlink, the resource grid may be defined by a plurality of subcarriers and a plurality of OFDM symbols. In uplink, the resource grid may be defined by a plurality of subcarriers and a plurality of SC-FDMA symbols. The number of subcarriers constituting one slot may depend on a cell bandwidth. In one slot, seven OFDM symbols or SC-FDMA symbols may be included. Here, each element within a resource grid is referred to as a resource element. The resource element may be identified by a subcarrier number, and an OFDM symbol or SC-FDMA symbol number.

A resource block may be used to express mapping of a certain physical channel (the PDSCH, the PUSCH, or the like) to the resource elements. The resource block may be defined by a virtual resource block and a physical resource block. A certain physical channel may firstly be mapped to the virtual resource block. Thereafter, the virtual resource block may be mapped to the physical resource block. One physical resource block may be defined with seven consecutive OFDM symbols or SC-FDMA symbols in a time domain and by twelve consecutive subcarriers in a frequency domain. Therefore, one physical resource block may include (7×12) resource elements. Furthermore, one physical resource block may correspond to one slot in the time domain and correspond to 180 kHz in the frequency domain. The physical resource blocks may be numbered from 0 in the frequency domain.

Hereinafter, CRC parity bits attached to a DCI format (which may be Downlink Control Information (DCI)) will be described in detail. Here, in the present embodiment, "CRC parity bit", "CRC bit", and "CRC" may be identical.

For example, 24 or 16 CRC parity bits may be attached to the corresponding DCI format. That is, the base station device 3 and the terminal device 1 may select (decide, determine) either 24 or 16 CRC parity bits to be attached to the corresponding DCI format, depending on one or more conditions. That is, the base station device 3 may transmit a DCI format, to which either first CRC parity bits (for example, 24 CRC parity bits) or second CRC parity bits (for example, 16 CRC parity bits) is attached. Furthermore, the terminal device 1 may monitor a DCI format to which the first CRC parity bits or the second CRC parity bits are attached. Here, as described above, the DCI format may be transmitted on the PDCCH.

For example, the base station device 3 may transmit a higher layer parameter (for example, an RRC layer parameter) to be used to configure (instruct or define) so that the terminal device 1 monitors a PDCCH including 24-bit CRC parity bits. Furthermore, the base station device 3 may transmit a higher layer parameter to be used to configure (instruct or define), for the terminal device 1, to monitor which one of the PDCCH including the 24-bit CRC parity bits or the PDCCH including the 16-bit CRC parity bits. Here, in the present embodiment, "higher layer parameter", "higher layer message", "higher layer signal", "higher layer information", and "higher layer information element" may be identical.

That is, the base station device 3 may transmit information (a parameter) on monitoring of DCI, to which the first CRC parity bits are attached, to the terminal device 1. Furthermore, the base station device 3 may transmit information (a parameter) on monitoring of DCI, to which the second CRC parity bits are attached, to the terminal device 1. Hereinafter, the information (the parameter) on the monitoring of the DCI, to which the first CRC parity bits are attached and/or the information (the parameter) on the monitoring of the DCI to which the second CRC parity bits are attached, are also simply referred to as a parameter for monitoring of DCI.

Here, in the present embodiment, "PDCCH transmitting a DCI format to which CRC parity bits are attached", "PDCCH including CRC parity bits and a DCI format", "PDCCH including CRC parity bits", and "PDCCH including a DCI format" may be identical. Moreover, in the present embodiment, "PDCCH including X" and "PDCCH involving X" may be identical. That is, the terminal device 1 may monitor a DCI format. The terminal device 1 may monitor DCI. The terminal device 1 may monitor a PDCCH.

For example, the parameter for monitoring DCI may be configured for each serving cell. The parameter for monitoring DCI may be configured for each cell group. The parameter for monitoring DCI may be configured only for a secondary cell. Moreover, the parameter for monitoring DCI may be configured only for a serving cell group that does not include a primary cell.

For example, in a case that a parameter for monitoring DCI is configured for a first serving cell, the terminal device 1, for which the first serving cell and a second serving cell have been configured, may monitor the PDCCH (DCI or a DCI format) in the first serving cell, based on the parameter for monitoring DCI. Here, the PDCCH (DCI or a DCI format) in the first serving cell may be used for scheduling the PDSCH in the first serving cell and/or the second serving cell. Furthermore, the PDCCH (DCI or a DCI format) in the first serving cell may be used for scheduling the PUSCH in the first serving cell and/or the second serving cell.

Here, the base station device 3 may transmit a higher layer parameter (for example, an RRC layer parameter) used for indicating that the PDSCH and/or the PUSCH are/is scheduled by using the PDCCH in either serving of the first serving cell or the second serving cell. That is, the base station device 3 may transmit information used for indicating in which serving cell a downlink assignment (also referred to as a downlink allocation) is signaled. Further, the base station device 3 may transmit information used for indicating in which serving cell an uplink grant is signaled.

The parameter for monitoring DCI may be applied only to the USS. That is, the parameter for monitoring DCI may not be applied to the monitoring of DCI in the CSS, but may be applied only to the monitoring of DCI in the USS. The parameter for monitoring DCI may be applied to either one the PDCCH or the EPDCCH.

In a case of satisfying a given condition, the terminal device 1 may monitor the PDCCH including 24-bit CRC parity bits. That is, in a case of satisfying a given condition, the terminal device 1 may monitor the PDCCH including the 24 bit-CRC parity bits, regardless of a higher layer parameter (a parameter for monitoring DCI or a configuration based on the parameter for monitoring DCI) for instructing the terminal device 1 to monitor the PDCCH including the 24-bit CRC parity bits.

Here, in a case of satisfying a given condition, the terminal device 1 may monitor the PDCCH including the 24-bit CRC parity bits in a secondary cell. In a case of satisfying a given condition, the terminal device 1 may monitor the PDCCH including the 24-bit CRC parity bits in a secondary cell, which belongs to a serving cell group in which no primary cell is included. In a case of satisfying a given condition, the terminal device 1 may monitor the PDCCH including the 24-bit CRC parity bits in the USS (or only in the USS). In a case of satisfying a given condition, the terminal device 1 may monitor the EPDCCH including the 24-bit CRC parity bits (or only the EPDCCH).

For example, in a case that more than a given number of serving cells (for example, more than five serving cells) are configured for the terminal device 1 by using a higher layer parameter (for example, an RRC layer parameter), the terminal device 1 may monitor or may determine to monitor the PDCCH including the 24-bit CRC parity bits. That is, in a case that a given number of serving cells or fewer (for example, five serving cells or fewer) are configured for the terminal device 1 by using a higher layer parameter (for example, an RRC layer parameter), the terminal device 1 may monitor the PDCCH including the 24-bit CRC parity bits, or the PDCCH including the 16-bit CRC parity bits, according to the configuration based on the parameter for monitoring DCI.

Furthermore, the terminal device 1 may monitor (or may determine to monitor) the PDCCH including the 24-bit CRC parity bits, based on the number of the PDCCH candidates monitored by the terminal device 1 in a certain subframe and/or the size of a DCI format (the payload size of a DCI format and the number of payload sizes of a DCI format) monitored by the terminal device 1 in the certain subframe.

For example, in a case that a product of the number of PDCCH candidates monitored by the terminal device 1 in a certain subframe and the size of a DCI format monitored by the terminal device 1 in the certain subframe is larger than a predetermined value, the terminal device 1 may monitor (or may determine to monitor) the PDCCH including the 24-bit CRC parity bits.

Hereinafter, "the terminal device 1 monitors the PDCCH including the 24-bit CRC parity bits, based on a higher layer parameter (for example, an RRC layer parameter) instructing the terminal device 1 to monitor the PDCCH including the 24-bit CRC parity bits and/or a predetermined condition as described above" is also simply denoted as "the terminal device 1 is configured to monitor the PDCCH including the 24-bit CRC parity bits".

Hereinafter, "the terminal device 1 does not monitor the PDCCH including the 24-bit CRC parity bits, based on a higher layer parameter (for example, an RRC layer parameter) instructing the terminal device 1 to monitor the PDCCH including the 24-bit CRC parity bits and/or a predetermined condition as described above" is also denoted as "the terminal device 1 is not configured to monitor the PDCCH including the 24-bit CRC parity bits".

Here, in a case that at least one of the following condition (a) to condition (d) is satisfied, 16 CRC parity bits may be attached to the corresponding DCI format. That is, in the case that at least one of the following condition (a) to the condition (d) is satisfied, the base station device 3 may transmit DCI, to which the 16-bit CRC parity bits are attached. In the case that at least one of the following condition (a) to the condition (d) is satisfied, the terminal device 1 may monitor DCI, to which the 16-bit CRC parity bits are attached. That is, in the case that at least one of the following condition (a) to the condition (d) is satisfied, the terminal device 1 may monitor the PDCCH including the 16-bit CRC parity bits.

Condition (a): The terminal device 1 is not configured by using a higher layer parameter (for example, an RRC layer parameter), to monitor the PDCCH including 24-bit CRC parity bits Condition (b): A corresponding DCI format is mapped to the CSS (transmitted in the CSS)

Condition (c): A corresponding DCI format is mapped to the USS given by at least a temporary C-RNTI (transmitted at least in the USS given by a Temporary C-RNTI).

Condition (d): CRC parity bits attached to a corresponding DCI format are scrambled with a predetermined RNTI.

That is, for example, in a case that the terminal device 1 is not configured by using a higher layer parameter (an RRC layer parameter or a parameter for monitoring DCI) to monitor the PDCCH including the 24-bit CRC parity bits, 16 CRC parity bits may be attached to a corresponding DCI format.

For example, in a case that a corresponding DCI format is mapped to the CSS, 16 CRC parity bits may be attached to the corresponding DCI format. That is, in a case of transmitting a DCI format in the CSS, the base station device 3 may attach the 16-bit CRC parity bits to the DCI format to transmit the DCI format. Furthermore, in a case of receiving a DCI format in the CSS, the terminal device 1 may receive the DCI format to which the 16-bit CRC parity bits are attached.

That is, in a case that a corresponding DCI format is mapped to the USS, 16 or 24 CRC parity bits may be attached to the corresponding DCI format.

That is, in a case of configuring the terminal device 1 to monitor the PDCCH (or a DCI format) including the 24-bit CRC parity bits and in a case of transmitting the DCI format in the USS, the base station device 3 may attach the 24-bit CRC parity bits to the DCI format to transmit the DCI format. The terminal device 1 may receive a DCI format, to which the 24-bit CRC parity bits are attached, in a case that the terminal device 1 is configured to monitor the PDCCH (or a DCI format) including the 24-bit CRC parity bits and receiving the DCI format in the USS.

The base station device 3 may attach the 16-bit CRC parity bits to a DCI format to transmit a DCI format, in a case that the terminal device 1 is not configured to monitor the PDCCH (or the DCI format) including the 24-bit CRC parity bits and in a case that the terminal device 1 transmits the DCI format in the USS. The terminal device 1 may receive a DCI format, to which the 24-bit CRC parity bits are attached, in a case that the terminal device 1 is not configured to monitor the PDCCH (or the DCI format) including the 24-bit CRC parity bits and receiving the DCI format in the USS.

For example, in a case that a corresponding DCI format is mapped to the USS given by at least a Temporary C-RNTI, 16 CRC parity bits may be attached to the corresponding DCI format. That is, in a case of transmitting a DCI format in the USS given by at least a Temporary C-RNTI, the base station device 3 may attach the 16-bit CRC parity bits to the DCI format to transmit the DCI format. In a case of receiving a DCI format in the USS given by at least a Temporary C-RNTI, the terminal device 1 may receive the DCI format, to which the 16-bit CRC parity bits are attached.

That is, in a case that a corresponding DCI format is mapped to the USS given by at least a C-RNTI, 16 or 24 CRC parity bits may be attached to the corresponding DCI format.

That is, in a case of configuring the terminal device 1 to monitor the PDCCH (or a DCI format) including the 24-bit CRC parity bits and transmitting the DCI format in the USS given by at least a C-RNTI, the base station device 3 may attach the 24-bit CRC parity bits to the DCI format to transmit the DCI format. In a case of configuring the terminal device 1 to monitor the PDCCH (or a DCI format) including the 24-bit CRC parity bits and to receive the DCI format in the USS given by at least a C-RNTI, the terminal device 1 may receive the DCI format, to which the 24-bit CRC parity bits are attached.

That is, in a case of configuring the terminal device 1 to monitor the PDCCH (or a DCI format) including the 24-bit CRC parity bits, the base station device 3 may transmit DCI to which the 24-bit CRC parity bits are attached in the USS given by at least a C-RNTI, and may transmit DCI to which the 16-bit CRC parity bits are attached in the CSS.

In a case of not configuring the terminal device 1 to monitor the PDCCH (or a DCI format) including the 24-bit CRC parity bits, the base station device 3 may transmit DCI to which the 16-bit CRC parity bits are attached in the USS given by at least the C-RNTI, and may transmit DCI to which the 16-bit CRC parity bits are attached in the CSS.

In a case that the terminal device 1 is configured to monitor the PDCCH (or a DCI format) including the 24-bit CRC parity bits, the terminal device 1 may monitor DCI to which the 24-bit CRC parity bits are attached in the USS given by at least a C-RNTI, and may monitor DCI to which the 16-bit CRC parity bits are attached in the CSS.

In a case that the terminal device 1 is not configured to monitor the PDCCH (or a DCI format) including the 24-bit CRC parity bits, the terminal device 1 may monitor DCI to which the 16-bit CRC parity bits are attached in the USS given by at least a C-RNTI, and may monitor DCI to which the 16-bit CRC parity bits are attached in the CSS.

The base station device 3 may transmit DCI, to which the 16-bit CRC parity bits are attached in the USS given by at least a Temporary C-RNTI, regardless of whether the base station device 3 has configured the terminal device 1 to monitor the PDCCH (or a DCI format) including the 24-bit CRC parity bits.

The terminal device 1 may monitor DCI, to which the 16-bit CRC parity bits are attached in the USS given by at least a Temporary C-RNTI, regardless of whether the terminal device 1 is configured to monitor the PDCCH (or a DCI format) including the 24-bit CRC parity bits.

For example, in a case that the CRC parity bits attached to a corresponding DCI format are scrambled with a predetermined RNTI, 16 CRC parity bits may be attached to the corresponding DCI format. Here, a C-RNTI may not necessarily be included in the predetermined RNTI. An SPS C-RNTI may not necessarily be included in the predetermined RNTI. A temporary C-RNTI may be included in the predetermined RNTI. A Random Access Radio Network Temporary Identifier (RA-RNTI) may be included in the predetermined RNTI.

That is, the base station device 3 may transmit DCI, to which the 16-bit CRC parity bits scrambled with the RA-RNTI are attached, regardless of whether the base station device 3 has configured the terminal device 1 to monitor the PDCCH (or a DCI format) including the 24-bit CRC parity bits.

Furthermore, the terminal device 1 may monitor DCI, to which the 16-bit CRC parity bits scrambled with the RA-RNTI are attached, regardless of whether the terminal device 1 is configured to monitor the PDCCH (or a DCI format) including the 24-bit CRC parity bits.

Here, the DCI, to which the CRC parity bits scrambled with the RA-RNTI are attached, may be transmitted only in the CSS. That is, the DCI, to which the 16-bit CRC parity bits scrambled with the RA-RNTI are attached, may be transmitted only in the CSS.

The 24-bit CRC parity bits may be scrambled with a C-RNTI. Furthermore, the 16 bit parity bits may be scrambled with a C-RNTI or a Temporary C-RNTI.

That is, in a case that none of the condition (a) to the condition (d) is satisfied, 24 CRC parity bits may be attached to a corresponding DCI format. For example, in a case that (1) the terminal device 1 is configured, by using the higher layer parameter (for example, an RRC layer parameter), to monitor the PDCCH including the 24-bit CRC parity bits, (2) a corresponding DCI format is mapped to the USS given by at least a C-RNTI, and (3) CRC parity bits attached to the corresponding DCI format is scrambled with an RNTI (for example, a C-RNTI) different from a predetermined RNTI, 24 CRC parity bits may be attached to the corresponding DCI format.

Here, it is noted that in the above-described process, all or some of the condition (a) to the condition (d) may be used. It is also noted that in the above-described process, another condition different from any of the condition (a) to the condition (d) may be used.

Hereinafter, a method for scrambling CRC parity bits with an RNTI will be described in detail. It is noted that an RNTI having 16 bits will be described in the present embodiment, but an RNTI having another number of bits different from 16 bits may be applicable. Here, the base station device 3 may perform a process of scrambling CRC parity bits with an RNTI. That is, in a case of performing a CRC parity check, the terminal device 1 may consider that the CRC parity bits are scrambled with an RNTI.

That is, an error detection may be provided, based on a bit sequence given as a result of scrambling CRC parity bits with an RNTI. An error detection may be performed, based on a bit sequence given as a result of scrambling CRC parity bits with an RNTI.

In the present embodiment, "16 CRC parity bits" is also referred to as "16-bit CRC", "CRC of 16 bits", or "CRC parity bits of 16 bits". In the present embodiment, "24 CRC parity bits" is also referred to as "24-bit CRC", "CRC of 24 bits", or "CRC parity bits of 24 bits".

Figure 4:
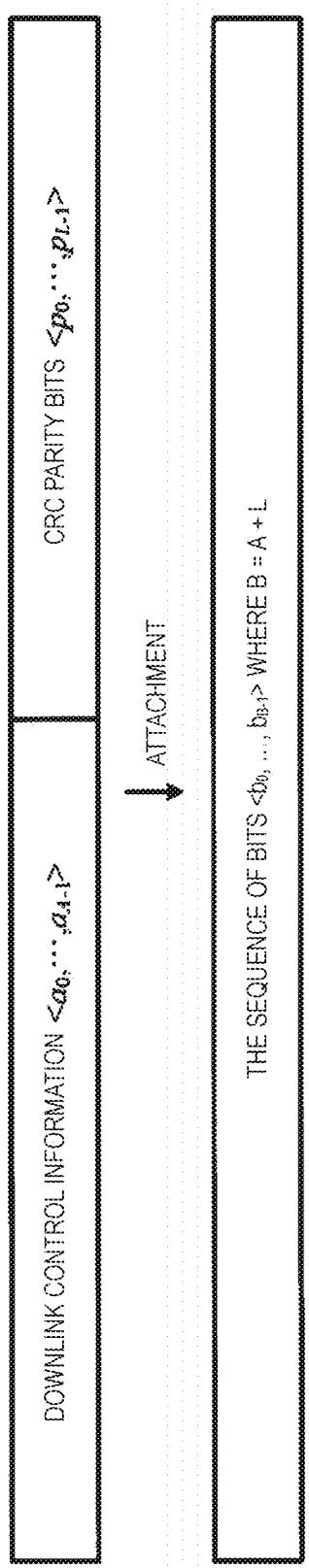
FIG. 4 is a diagram illustrating attachment of CRC parity bits in the present embodiment.

FIG. 4 is a diagram illustrating attaching of CRC parity bits in the present embodiment. As described above, CRC parity bits may be attached to a DCI format (or Downlink Control Information (DCI)). The CRC parity bits may be scrambled with an RNTI after being attached to a DCI format.

In FIG. 4, $a_i$ may be bits of DCI (a DCI payload) corresponding to CRC parity bits. A may be the number of bits of the DCI (the size of the DCI payload) corresponding to the CRC parity bits. $p_i$ is the CRC parity bits. Moreover, L may be the number of the CRC parity bits. Furthermore, a bit sequence $<b_0, \ldots, b_{B-1}>$ may be given by attaching of CRC parity bits $<p_0, \ldots, p_{L-1}>$ to DCI (the DCI payload) $<a_0, \ldots, a_{A-1}>$. Hereinafter, each symbol is also used in the same meaning in the descriptions of FIG. 5 to FIG. 8.

Figure 5:
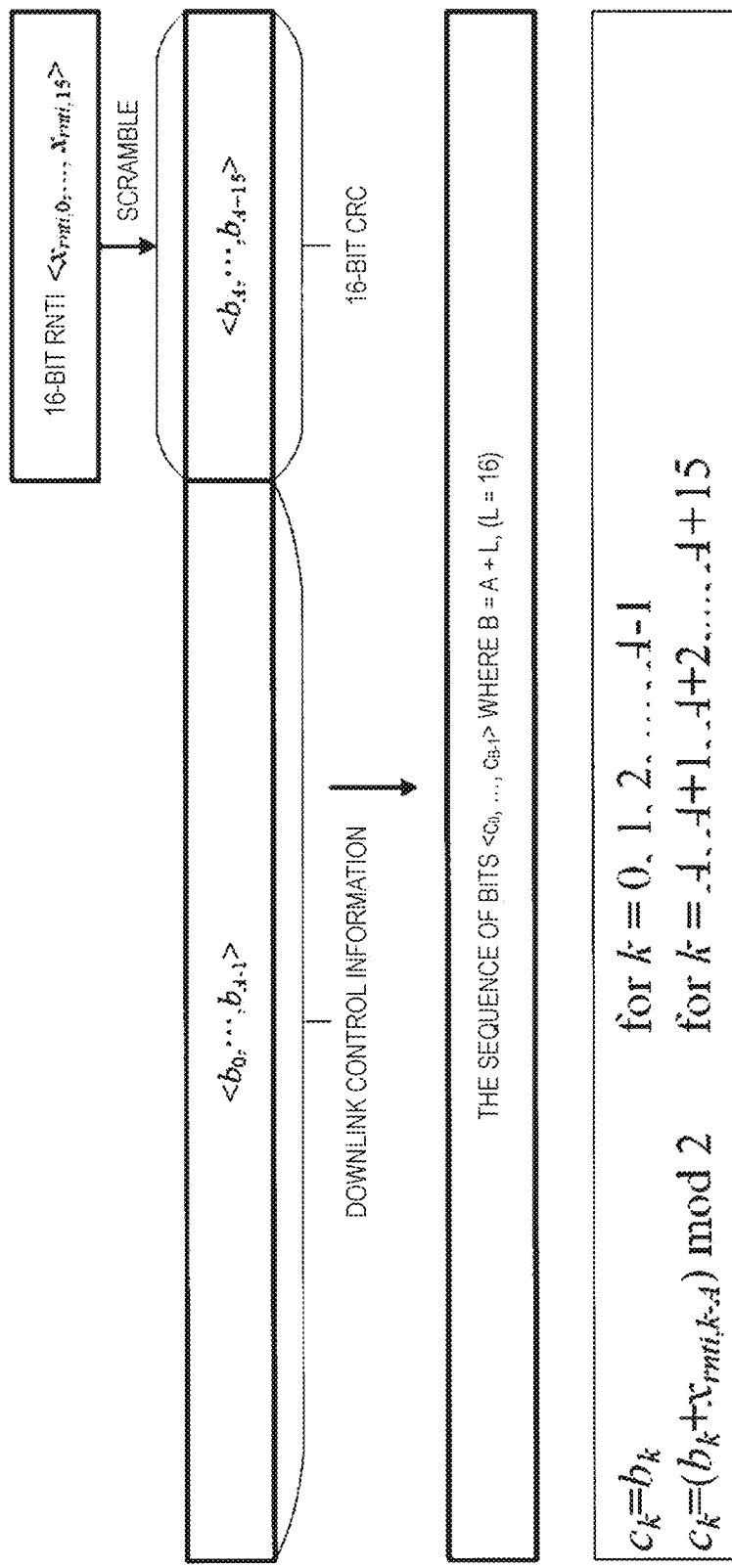
FIG. 5 is a diagram illustrating scrambling of CRC parity bits with an RNTI in the present embodiment.

FIG. 5 is a diagram illustrating scrambling of CRC parity bits with an RNTI in the present embodiment. As illustrated in FIG. 5, a bit sequence $<c_0, \ldots, c_{B-1}>$ (B=A+L) may be given by scrambling a part $<b_A, \ldots, b_{A+15}>$ of a bit sequence $<b_0, \ldots, b_{A-1}, b_A, \ldots, b_{A+15}>$ with an RNTI $<x_{rnti, 0}, \ldots, x_{rnti, 15}>$. That is, the bit sequence $<c_0, \ldots, c_{A+L-1}>$ may be given by scrambling CRC parity bits $<b_A, \ldots, b_{A+L-1}>$ (L=16) of a bit sequence $<b_0, \ldots, b_{A+L-1}>$ (L=16) with the RNTI $<x_{rnti, 0}, \ldots, x_{rnti, 15}>$, and may be transmitted and received on the PDCCH.

Here, the bit sequence $<b_0, \ldots, b_{A-1}, b_A, \ldots, b_{A+15}>$ may be given by attaching a 16-bit CRC $<p_0, \ldots, p_{L-1}>$ to a DCI payload $<a_0, \ldots, a_{A-1}>$. That is, the bit sequence $<b_0, \ldots, b_{A-1}>$ may be the DCI (DCI payload), and the bit sequence $<b_A, \ldots, b_{A+15}>$ may be a 16-bit CRC. That is, the 16-bit CRC $<b_A, \ldots, b_{A+15}>$ may be scrambled with the RNTI $<x_{rnti, 0}, \ldots, x_{rnti, 15}>$.

That is, in a case that L (the number of CRC parity bits) is 16, the bit sequence $<c_0, \ldots, c_{A+L-1}>$ may be given by the following Expression 1.

$$c_k = b_k \text{ for } k=0,1,2,\ldots,A-1$$

$$c_k = (b_k + x_{rnti,k-A}) \bmod 2 \text{ for } k=A, A+1, A+2, \ldots, A+15 \quad \text{Expression 1}$$

Figure 6:
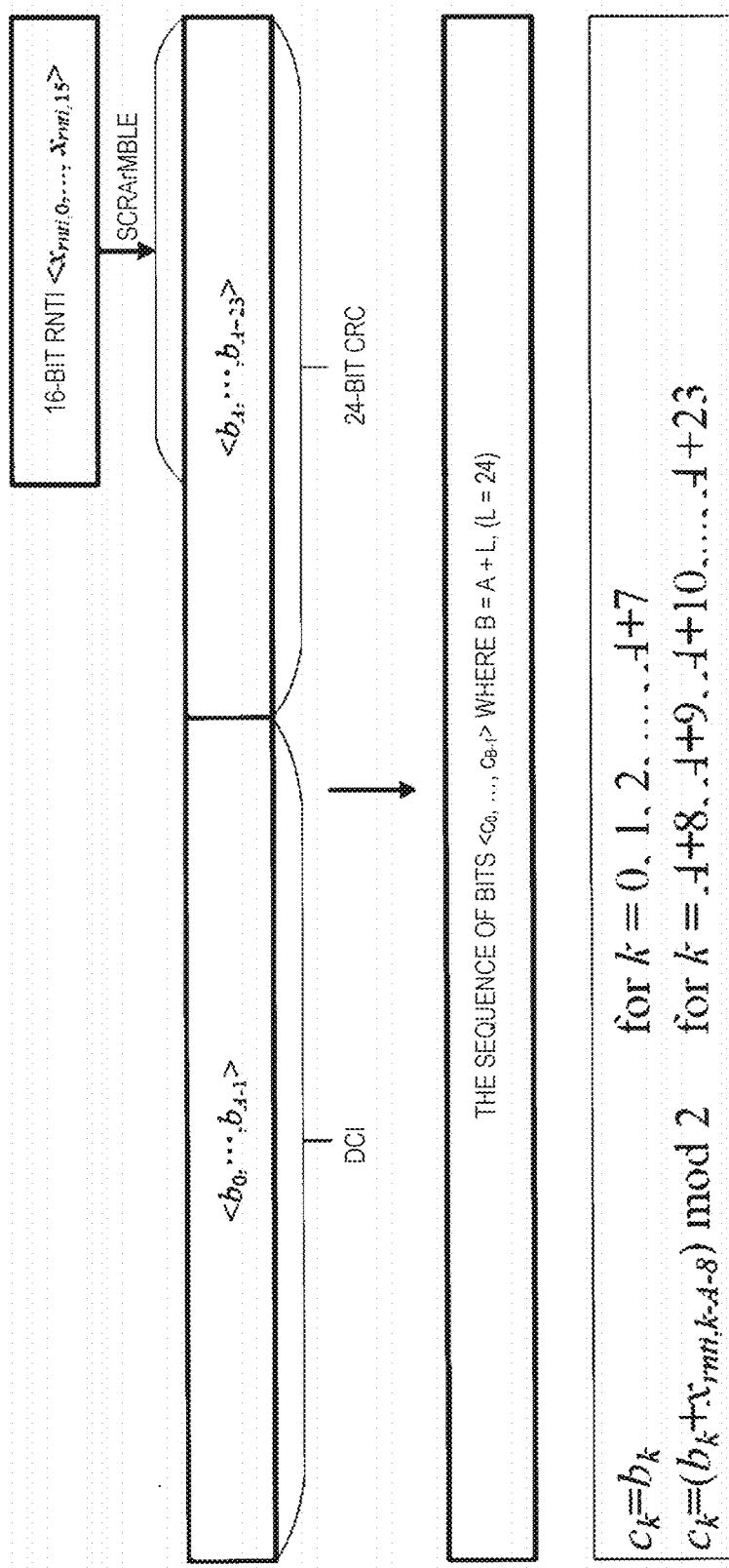
FIG. 6 is another diagram illustrating scrambling of CRC parity bits with an RNTI in the present embodiment.

FIG. 6 is another diagram illustrating scrambling of CRC parity bits with an RNTI in the present embodiment. As illustrated in FIG. 6, the bit sequence $<c_0, \ldots, c_{B-1}>$ (B=A+L) may be given by scrambling a part $<b_{A+8}, \ldots, b_{A+23}>$ of a bit sequence $<b_0, \ldots, b_{A-1}, b_A, \ldots, b_{A+23}>$ with the RNTI $<x_{rnti, 0}, \ldots, x_{rnti, 15}>$. That is, a bit sequence $<c_0, \ldots, c_{A+L-1}>$ may be given by scrambling a bit sequence $<b_{A+8}, \ldots, b_{A+L-1}>$ (L=23) of CRC parity bits $<b_A, \ldots, b_{A+L-1}>$ (L=23) in the bit sequence $<b_0, \ldots, b_{A+L-1}>$ (L=23) with the RNTI $<x_{rnti, 0}, \ldots, x_{rnti, 15}>$, and may be transmitted and received on the PDCCH.

Here, the bit sequence $<b_0, \ldots, b_{A-1}, b_A, \ldots, b_{A+23}>$ may be given by attaching of a 24-bit CRC $<p_0, \ldots, p_{L-1}>$ to a DCI payload $<a_0, \ldots, a_{A-1}>$. That is, the bit sequence $<b_0, \ldots, b_{A-1}>$ may be DCI (a DCI payload) and the bit sequence $<b_A, \ldots, b_{A+23}>$ may be the 24-bit CRC. That is, the bit sequence $<b_{A+8}, \ldots, b_{A+23}>$ of the 24-bit CRC $<b_A, \ldots, b_{A+23}>$ may be scrambled with the RNTI $<x_{rnti, 0}, \ldots, x_{rnti, 15}>$. That is, the bit sequence $<b_A, \ldots, b_{A+7}>$ of the 24-bit CRC $b_{A+23}>$ may not be necessarily scrambled with an RNTI $<x_{rnti}, 0, \ldots, x_{rnti, 15}>$.

That is, in a case that L (the number of CRC parity bits) is 24, the bit sequence $<c_0, \ldots, c_{A+L-1}>$ may be given by the following Expression 2.

$$c_k = b_k \text{ for } k=0,1,2,\ldots,A+7$$

$$c_k = (b_k + x_{rnti,k-A-8}) \bmod 2 \text{ for } k=A+8, A+9, A+10, \ldots, A+23 \quad \text{Expression 2}$$

Figure 7:
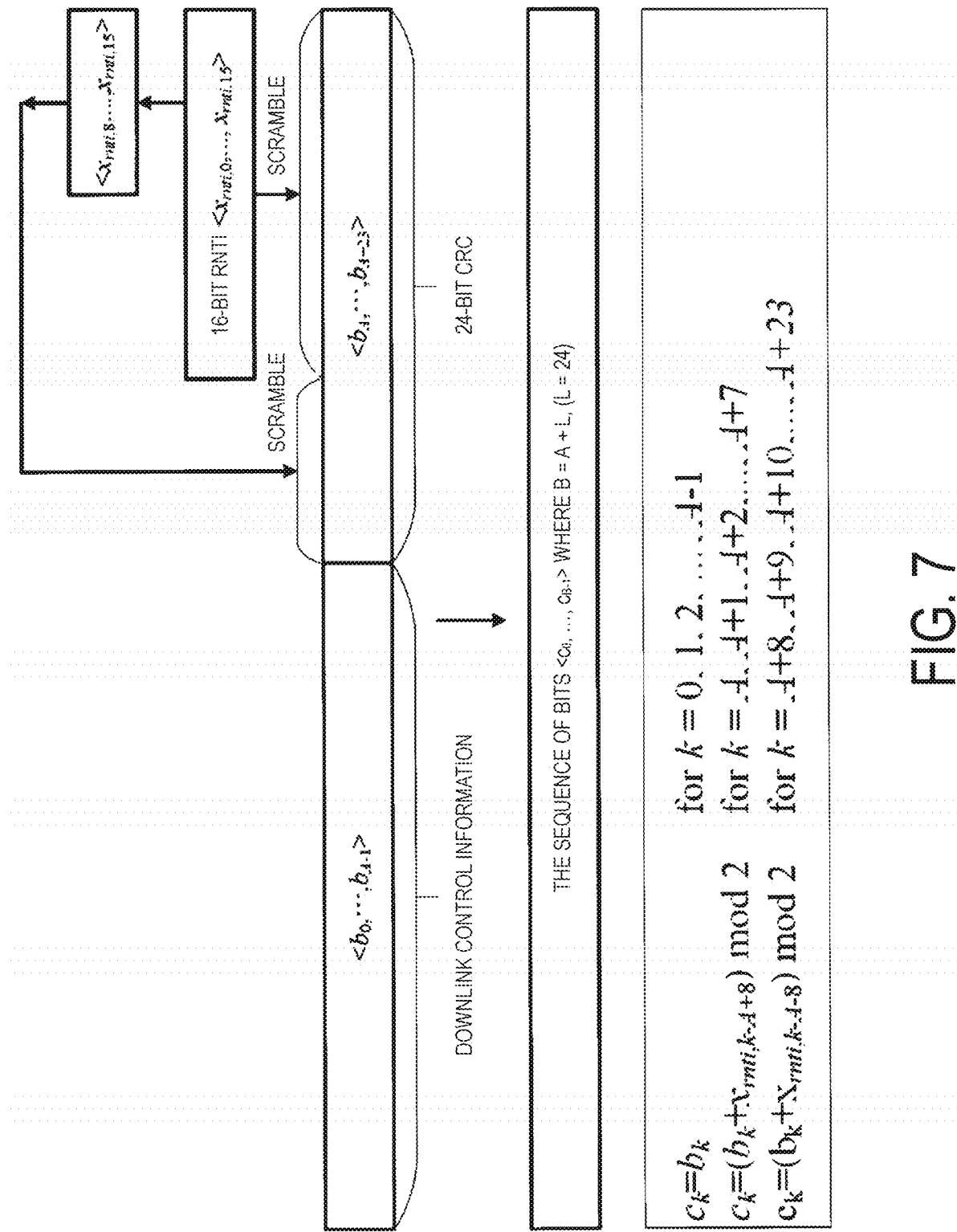
FIG. 7 is another diagram illustrating scrambling of CRC parity bits with an RNTI in the present embodiment.

FIG. 7 is another diagram illustrating scrambling of CRC parity bits with an RNTI in the present embodiment. Here, the bit sequence $<c_0, \ldots, c_{B-1}>$ (B=A+L) may be given by a process as illustrated in FIG. 7, and may be transmitted and received on the PDCCH.

That is, a part $<b_{A+8}, \ldots, b_{A+23}>$ of the bit sequence $<b_0, \ldots, b_{A-1}, b_A, \ldots, b_{A+23}>$ may be scrambled with the RNTI $<x_{rnti, 0}, \ldots, x_{rnti, 15}>$. That is, the bit sequence $<b_{A+8}, \ldots, b_{A+L-1}>$ (L=23) of CRC parity bits $<b_A, \ldots, b_{A+L-1}>$ (L=23) in a bit sequence $<b_0, \ldots, b_{A+L-1}>$ (L=23) may be scrambled with the RNTI $<x_{rnti, 0}, \ldots, x_{rnti, 15}>$.

Here, the bit sequence $<b_0, \ldots, b_{A-1}, b_A, \ldots, b_{A+23}>$ may be given by attaching a 24-bit CRC $<p_0, \ldots, p_{L-1}>$ to a DCI payload $<a_0, \ldots, a_{A-1}>$. That is, the bit sequence $<b_0, \ldots, b_{A-1}>$ may be DCI (a DCI payload) and the bit sequence $<b_A, \ldots, b_{A+23}>$ may be the 24-bit CRC. That is, the bit sequence $<b_{A+8}, \ldots, b_{A+23}>$ of the 24-bit CRC $<b_A, \ldots, b_{A+23}>$ may be scrambled with the RNTI $<x_{rnti, 0}, \ldots, x_{rnti, 15}>$.

The bit sequence $<b_A, \ldots, b_{A+7}>$ of the 24-bit CRC $<b_A, \ldots, b_{A+23}>$ may be scrambled with the bit sequence $<x_{rnti, 0}, \ldots, x_{rnti, 15}>$ of RNTI $<x_{rnti, 0}, \ldots, x_{rnti, 15}>$. That is, the bit sequence $<b_A, \ldots, b_{A+7}>$ of the 24-bit CRC $<b_A, \ldots, b_{A+23}>$ may be scrambled with a part $<x_{rnti, 0}, \ldots, x_{rnti, 15}>$ of the RNTI $<x_{rnti, 0}, \ldots, x_{rnti, 15}>$.

That is, in a case that L (the number of CRC parity bits) is 24, the bit sequence $<c_0, \ldots, c_{A-1}>$ may be given by the following Expression 3.

$$c_k = b_k \text{ for } k=0,1,2,\ldots,A-1$$

$$c_k = (b_k + x_{rnti,k-A+8}) \bmod 2 \text{ for } k=A, A+1, A+2, \ldots, A+7$$

$$c_k = (b_k + x_{rnti,k-A-8}) \bmod 2 \text{ for } k=A+8, A+9, A+10, \ldots, A+23 \quad \text{Expression 3}$$

Figure 8:
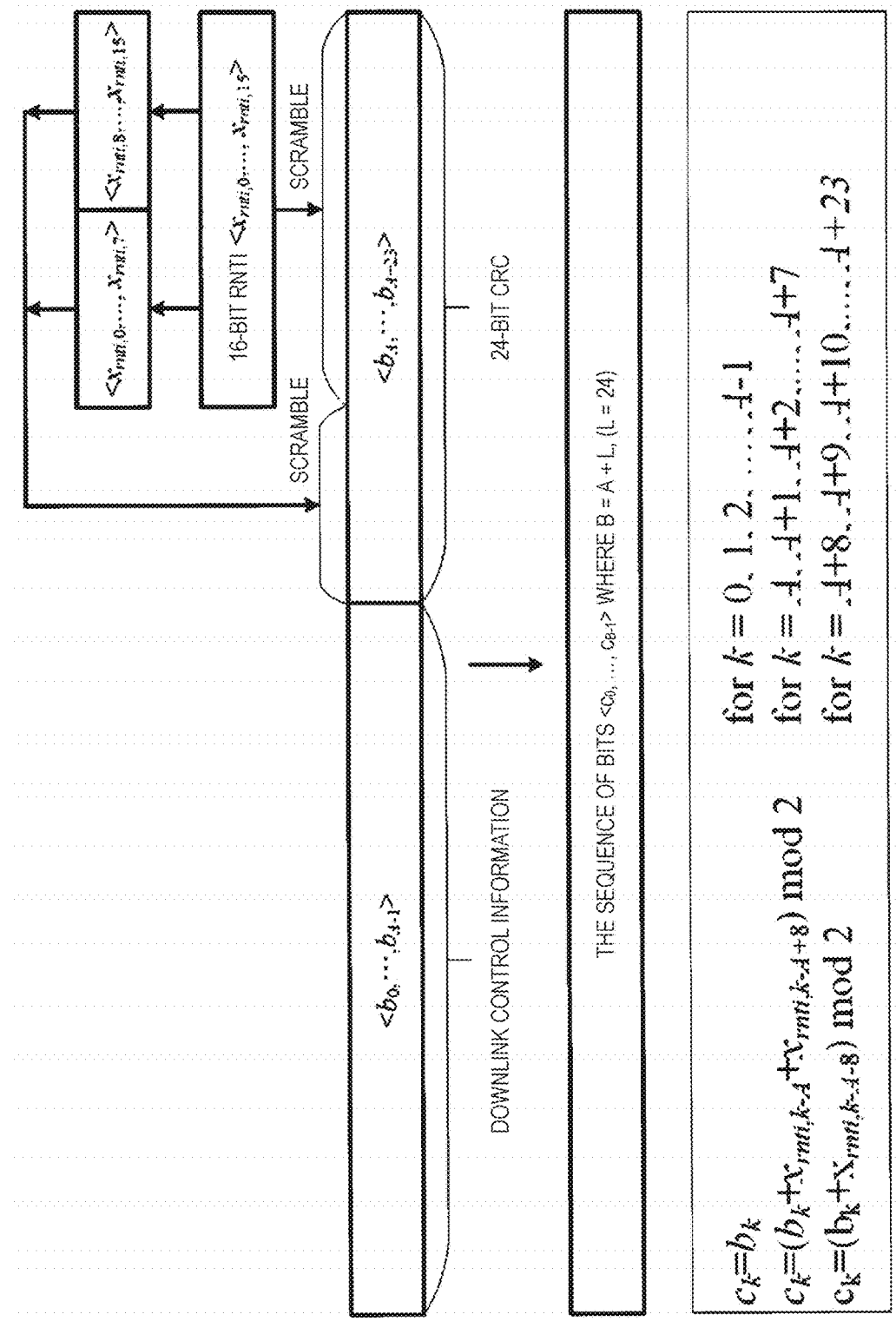
FIG. 8 is another diagram illustrating scrambling of CRC parity bits with an RNTI in the present embodiment.

FIG. 8 is another diagram illustrating scrambling of CRC parity bits with an RNTI in the present embodiment. Here, the bit sequence $<c_0, \ldots, c_{B-1}>$ (B=A+L) may be given by a process as illustrated in FIG. 8, and may be transmitted and received on the PDCCH.

That is, a part $<b_{A+8}, \ldots, b_{A+23}>$ of the bit sequence $<b_0, \ldots, b_{A-1}, b_A, \ldots, b_{A+23}>$ may be scrambled with the RNTI $<x_{rnti, 0}, \ldots, x_{rnti, 15}>$. That is, the bit sequence $<b_{A+8}, \ldots, b_{A+L-1}>$ (L=23) of CRC parity bits $<b_A, \ldots, b_{A+L-1}>$ (L=23) in a bit sequence $<b_0, \ldots, b_{A+L-1}>$ (L=23) may be scrambled with the RNTI $<x_{rnti, 0}, \ldots, x_{rnti, 15}>$.

Here, the bit sequence $<b_0, \ldots, b_{A-1}, b_A, \ldots, b_{A+23}>$ may be given by attaching a 24-bit CRC $<p_0, \ldots, p_{L-1}>$ to a DCI payload $<a_0, \ldots, a_{A-1}>$. That is, the bit sequence $<b_0, \ldots, b_{A-1}>$ may be DCI (a DCI payload) and the bit sequence $<b_A, \ldots, b_{A+23}>$ may be the 24-bit CRC. That is, the bit sequence $<b_{A+8}, \ldots, b_{A+23}>$ of the 24-bit CRC $<b_A, \ldots, b_{A+23}>$ may be scrambled with the RNTI $<x_{rnti, 0}, \ldots, x_{rnti, 15}>$.

The bit sequence $<b_A, \ldots, b_{A+7}>$ of the 24-bit CRC $<b_A, \ldots, b_{A+23}>$ may be scrambled with the bit sequence $<x_{rnti, 8}, \ldots, x_{rnti, 15}>$ of the RNTI $<x_{rnti, 0}, \ldots, x_{rnti, 15}>$ and the bit sequence $<x_{rnti, 0}, \ldots, x_{rnti, 7}>$ of the RNTI $<x_{rnti, 0}, \ldots, x_{rnti, 15}>$. That is, the bit sequence $<b_A, \ldots, b_{A+7}>$ of the 24-bit CRC $<b_A, \ldots, b_{A+23}>$ may be scrambled with a part $<x_{rnti, 8}, \ldots, x_{rnti, 15}>$ of the RNTI $<x_{rnti, 0}, \ldots, x_{rnti, 15}>$ and the remainder $<x_{rnti, 0}, \ldots, x_{rnti, 7}>$ of the RNTI $<x_{rnti, 0}, \ldots, x_{rnti, 15}>$.

That is, in a case that L (the number of CRC parity bits) is 24, the bit sequence $<c_0, \ldots, c_{A+L-1}>$ may be given by the following Expression 4.

$$c_k = b_k \text{ for } k=0,1,2,\ldots,A-1$$

$$c_k = (b_k + x_{rnti,k-A} + x_{rnti,k-A+8}) \bmod 2 \text{ for } k=A, A+1, A+2, \ldots, A+7$$

$$c_k = (b_k + x_{rnti,k-A-8}) \bmod 2 \text{ for } k=A+8, A+9, A+10, \ldots, A+23$$

Expression 4

As described above, an increase in the number of CRC parity bits scrambled with the RNTI reduces a possibility that a terminal device 1 mistakenly determines a PDCCH including CRC parity bits scrambled with an RNTI for another terminal device 1, as a PDCCH including the CRC parity bits scrambled with the RNTI for the terminal device 1.

Here, such an increase in the number of CRC parity bits reduces a coding rate for transmission on the PDCCH and/or increases a resource quantity needed for transmission on the PDCCH. Therefore, as described above, by changing the number of CRC parity bits attached to a corresponding DCI format (or Downlink Control Information (DCI)) depending on predetermined conditions, efficient communication is enabled by the base station device 3 and the terminal device 1.

Figure 9:
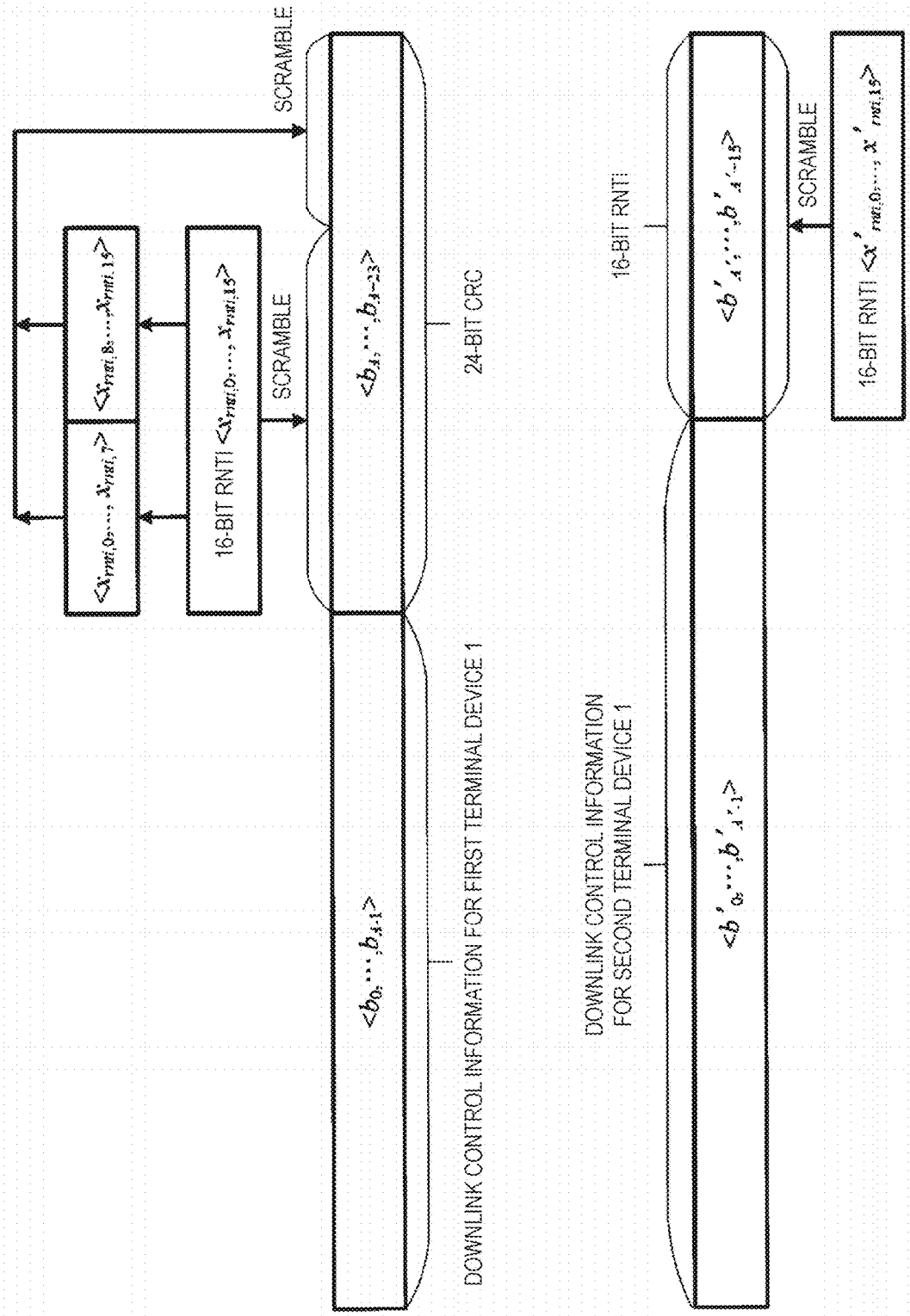
FIG. 9 is another diagram illustrating downlink control information to which CRC parity bits are attached in the present embodiment.

FIG. 9 is a diagram illustrating downlink control information to which CRC parity bits are attached in the present embodiment. The downlink control information illustrated in an upper part of FIG. 9 indicates downlink control information to which 24-bit CRC is attached. Furthermore, the downlink control information illustrated in a lower part of FIG. 9 indicates downlink control information to which 16-bit CRC is attached.

In FIG. 9, a bit sequence $<b_0, \ldots, b_{A-1}>$ indicates Downlink Control Information (DCI) for a first terminal device 1. A bit sequence $<b_A, \ldots, b_{A+23}>$ indicates a 24-bit CRC. A bit sequence $<x_{rnti, 0}, \ldots, x_{rnti, 15}>$ indicates an RNTI assigned to the first terminal device 1.

A bit sequence $<b'_0, \ldots, b'_{A'-1}>$ indicates downlink control information for a second terminal device 1. A bit sequence $<b'_{A'}, \ldots, b'_{A'+15}>$ indicates a 16-bit CRC. A bit sequence $<x'_{rnti, 0}, \ldots, x'_{rnti, 15}>$ indicates an RNTI assigned to the second terminal device 1.

Here, the bit sequence $<b_A, \ldots, b_{A+15}>$ of the 24-bit CRC $<b_A, \ldots, b_{A+23}>$ may be scrambled with the RNTI $<x_{rnti, 0}, \ldots, x_{rnti, 15}>$. That is, the bit sequence $<b_{A+16}, \ldots, b_{A+23}>$ of the 24-bit CRC $<b_A, \ldots, b_{A+23}>$ may be scrambled with a part $<x_{rnti, 8}, \ldots, x_{rnti, 15}>$ of the RNTI $<x_{rnti,0}, \ldots, x_{rnti, 15}>$ and the remainder $<x_{rnti, 0}, \ldots, x_{rnti, 7}>$ of the RNTI $<x_{rnti, 0}, \ldots, x_{rnti, 15}>$.

Furthermore, the 16-bit CRC $<b'_{A'}, \ldots, b'_{A'+15}>$ may be scrambled with the RNTI $<x'_{rnti, 0}, \ldots, x'_{rnti, 15}>$.

Here, even when an RNTI different from the RNTI for the first terminal device 1 is assigned to the second terminal device 1, scrambling applied to the last 16 bits $<b_{A+8}, \ldots, b_{A+23}>$ of the 24-bit CRC for the first terminal device 1 is sometimes identical to scrambling applied to the 16-bit CRC $b'_{A'}, \ldots, b'_{A'+15}>$ for the second terminal device 1. In this case, the possibility that the second terminal device 1 detects a PDCCH addressed to the first terminal device 1 as a PDCCH of the second terminal device 1 may increase.

For example, in a case of assigning an RNTI <1, 1, 1, 1, 1, 1, 1, 1, 1, 1, 1, 1, 1, 1, 1, 1> to the first terminal device 1 and assigning an RNTI <1, 1, 1, 1, 1, 1, 1, 1, 0, 0, 0, 0, 0, 0, 0, 0> to the second terminal device 1, the last 16 bits of the 24-bit CRC for the first terminal device 1, and the 16-bit CRC for the second terminal device 1 are both scrambled with a bit sequence <1, 1, 1, 1, 1, 1, 1, 1, 0, 0, 0, 0, 0, 0, 0, 0>.

Therefore, the base station device 3 may assign an RNTI to each of the first terminal device 1 and the second terminal device 1, so that the scrambling applied to the last 16 bits $<b_{A+8}, \ldots, b_{A+23}>$ of the 24-bit CRC for the first terminal device is not identical to the scrambling applied to the 16-bit CRC $<b'_{A'}, \ldots, b'_{A'+15}>$ for the second terminal device 1.

Furthermore, as in the examples illustrated in FIG. 6, FIG. 7, and FIG. 8, in a case that the second terminal device 1 is assigned with an RNTI, which is different from the RNTI assigned to the first terminal device 1, by scrambling the last 16 bits $<b_{A+8}, \ldots, b_{A+23}>$ of the 24-bit CRC for the first terminal device 1 with the RNTI $<x_{rnti, 0}, \ldots, x_{rnti, 15}>$ assigned to the first terminal 1, the scrambling applied to the last 16 bits $<b_{A+8}, \ldots, b_{A+23}>$ of the 24-bit CRC for the first terminal device 1 is enabled to certainly differ from the scrambling applied to the 16-bit CRC $<b'_{A'}, \ldots, b'_{A'+15}>$ for the second terminal device 1.

By performing operations as described above, efficient communication is enabled by the base station device 3 and the terminal device 1.

Hereinafter, UE transmit antenna selection in the present embodiment will be described. Here, UE transmit antenna selection may include closed-loop UE transmit antenna selection and open-loop UE transmit antenna selection.

For example, the UE transmit antenna selection may be performed by the terminal device 1. The UE transmit antenna selection may also be applied to a PUSCH, a DMRS related to a PUSCH, and an SRS. Alternatively, the UE transmit antenna selection may not necessarily be applied to a PUCCH, a DMRS related to a PUCCH, and a PRACH. Here, the PUCCH, the DMRS related to the PUCCH, and the PRACH may be transmitted by using a first transmit antenna port.

The UE transmit antenna selection may be configured by a higher layer via a higher layer parameter (ue-TransmitAntennaSelection). That is, the higher layer parameter (ue-TransmitAntennaSelection) may be notified by the base station device 3 to the terminal device 1.

Here, the higher layer parameter (ue-TransmitAntennaSelection) may be used to indicate a release or a setup. For example, the higher layer parameter (ue-TransmitAntennaSelection) may be used to indicate, for a setup, whether control of UE transmit antenna selection relates to a closed loop or an open loop. Furthermore, in a case that a received higher layer parameter (ue-TransmitAntennaSelection) indicates a release, the UE transmit antenna selection may be disabled by the terminal device 1.

In a case that the control of UE transmit antenna selection is indicated as the closed loop by a received higher layer parameter (ue-TransmitAntennaSelection), the closed-loop UE transmit antenna selection may be enabled by the higher layer. In a case that the control of UE transmit antenna selection is indicated as the open loop by a received higher layer parameter (ue-TransmitAntennaSelection), the open-loop UE transmit antenna selection may be enabled by the higher layer.

Here, in a case that the UE transmit antenna selection is disabled by the terminal device 1, the terminal device 1 may use the first transmit antenna port to transmit an uplink signal as described above.

In a case that the open-loop UE transmit antenna selection is enabled by the higher layer, a transmit antenna (a transmit antenna port) for a PUSCH and/or an SRS may be selected by the terminal device 1 itself.

In case that the closed-loop UE transmit antenna selection is enabled by the higher layer, the terminal device 1 may select a transmit antenna port for the PUSCH by referring to a latest transmit antenna selection command (a latest command) received from the base station device 3.

Here, the transmit antenna selection command may be notified by an antenna selection mask for CRC parity bits. That is, the "transmit antenna selection command" may be identical to the "antenna selection mask".

That is, the base station device 3 notifies the terminal device 1 of the transmit antenna port for the PUSCH, by using the antenna selection mask. The base station device 3 may select the antenna selection mask to scramble the CRC parity bits with the selected antenna selection mask. For example, in a case that the closed-loop UE transmit antenna selection is enabled by a higher layer, the terminal device 1 may specify (determine) an antenna selection mask selected by the base station device 3, based on CRC parity bits scrambled with the antenna selection mask.

Figure 10:
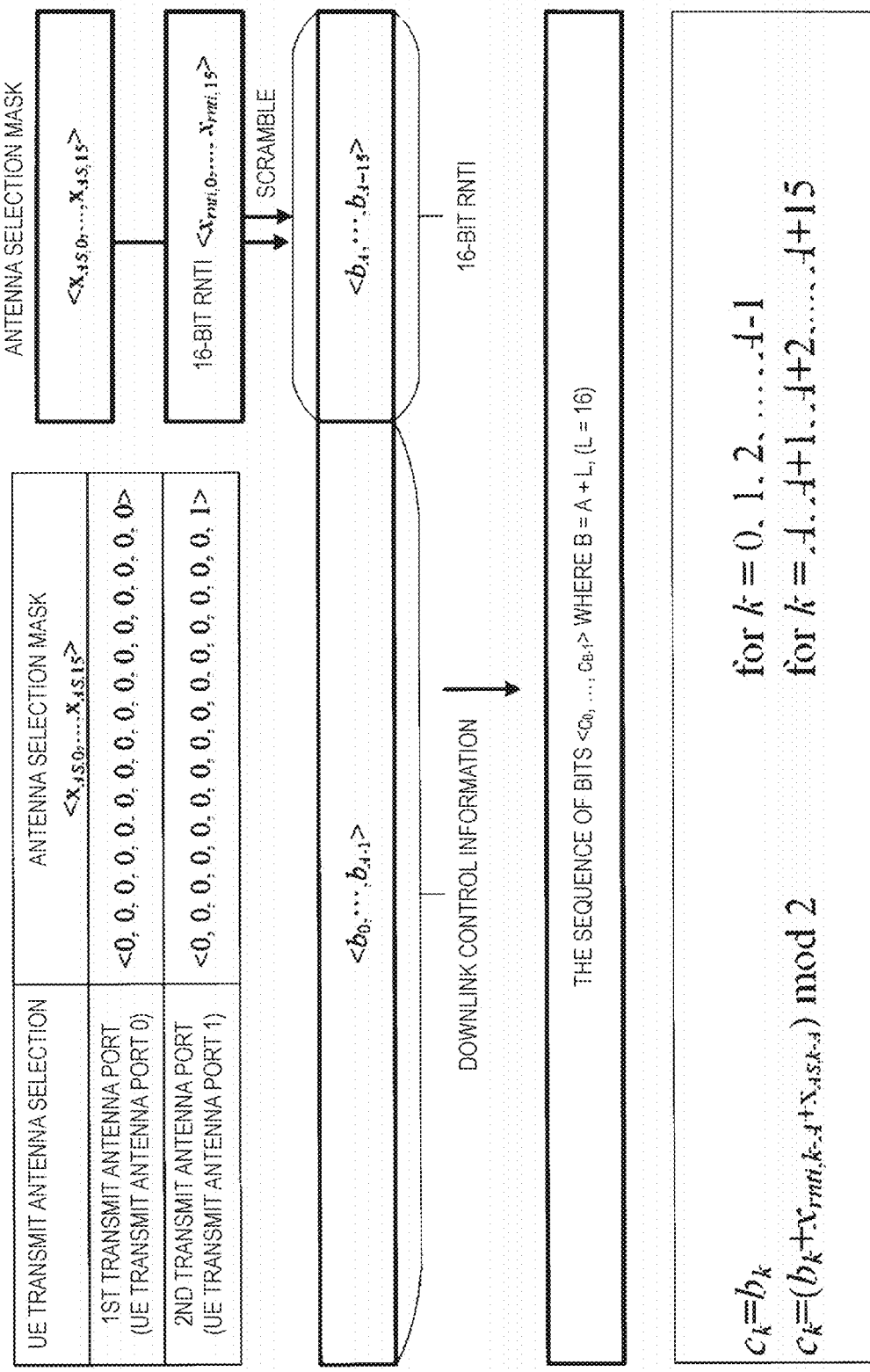
FIG. 10 is a diagram illustrating an antenna selection mask for a 16-bit CRC in the present embodiment.

FIG. 10 is a diagram illustrating an antenna selection mask for the 16-bit CRC in the present embodiment. FIG. 10 illustrates the 16-bit CRC $<b_A, \ldots, b_{A+15}>$ being scrambled with the RNTI $<x_{rnti, 0}, \ldots, x_{rnti, 15}>$ and the antenna selection mask $<x_{AS, 0}, \ldots, x_{AS, 15}>$. Here, the other descriptions in FIG. 10 are the same as FIG. 5, and thus omitted.

As illustrated in FIG. 10, in a case that L (the number of CRC parity bits) is 16, a bit sequence $<c_0, \ldots, c_{A+L-1}>$ may be given by the following Expression 5.

$c_k = b_k$ for $k=0,1,2,\ldots,A-1$ $c_k = (b_k + x_{rnti,k-A} + x_{AS,k-A}) \bmod 2$ for $k=A, A+1, A+2, \ldots, A+15$ Expression 5

Figure 11:
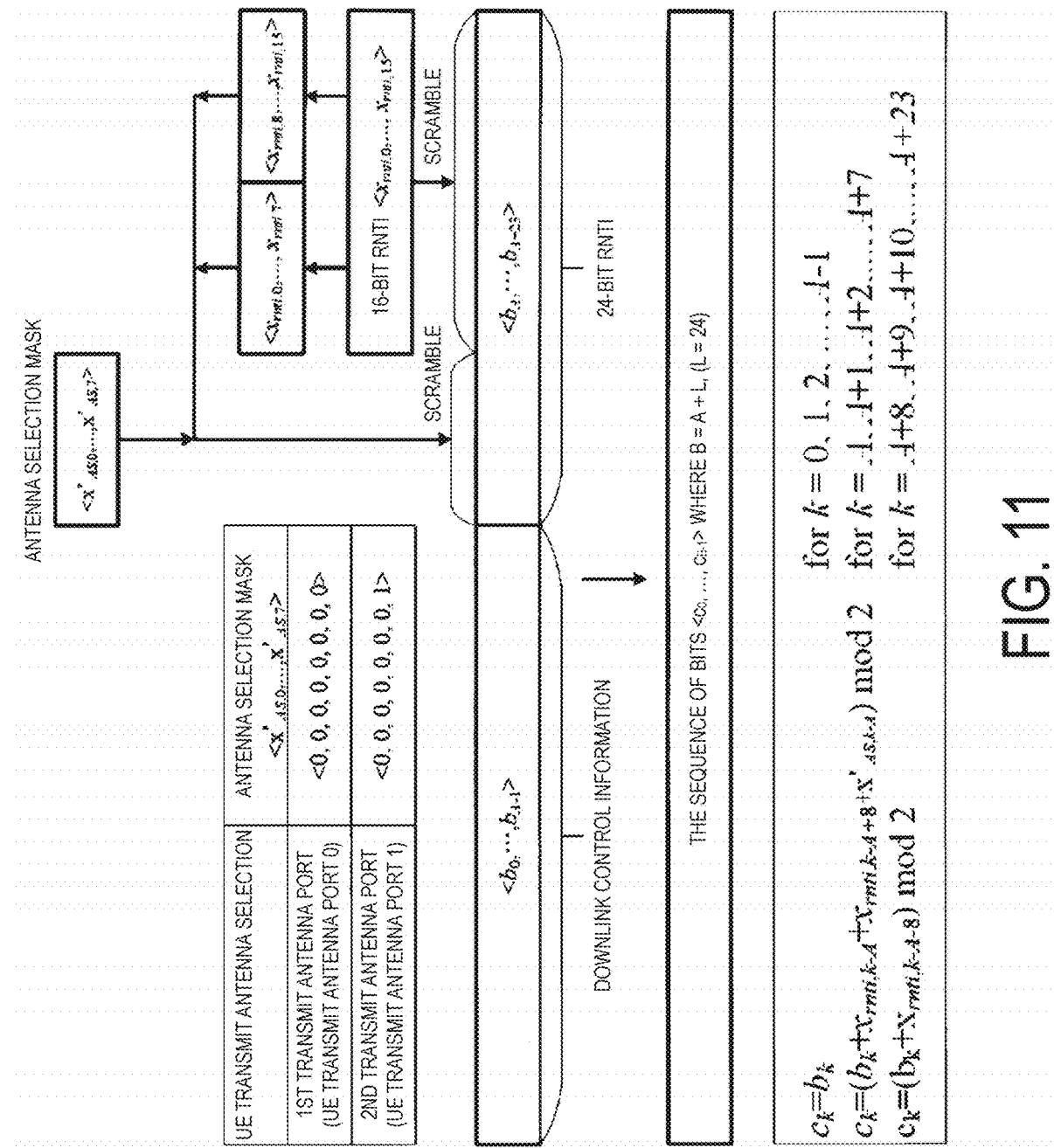
FIG. 11 is a diagram illustrating an antenna selection mask for a 24-bit CRC in the present embodiment.

FIG. 11 is a diagram illustrating an antenna selection mask for 24-bit CRC in the present embodiment. As illustrated in FIG. 11, the bit sequence $<b_A, \ldots, b_{A+7}>$ of the 24-bit CRC $<b_A, \ldots, b_{A+23}>$ may be scrambled with a part $<x_{rnti, 0}, \ldots, x_{rnti, 15}>$ of the RNTI $<x_{rnti, 0}, \ldots, x_{rnti, 15}>$, the remainder $<x_{rnti, 0}, \ldots, x_{rnti, 7}>$ of the RNTI $<x_{rnti, 0}, \ldots, x_{rnti, 15}>$, and the antenna selection mask $<x_{AS, 0}, \ldots, x_{AS, 15}>$. Here, the other descriptions in FIG. 11 are the same as FIG. 8, and thus omitted.

As illustrated in FIG. 11, in a case that L (the number of CRC parity bits) is 24, a bit sequence $<c_0, \ldots, c_{A+L-1}>$ may be given by the following Expression 6.

$c_k = b_k$ for $k=0,1,2,\ldots,A-1$ $c_k = (b_k + x_{rnti,k-A} + x_{rnti,k-A+8} + x'_{rnti,k-A+8}) \bmod 2$ for $k=A, A+1, A+2, \ldots, A+7$ $c_k = (b_k + x_{rnti,k-A-8}) \bmod 2$ for $k=A+8, A+9, A+10, \ldots, A+23$ Expression 6

Here, as illustrated in FIG. 10 and FIG. 11, a first set of a plurality of antenna selection masks applied to the 16-bit CRC and a second set of a plurality of antenna selection masks applied to the 24-bit CRC may be different from each other. That is, as illustrated in FIG. 10 and FIG. 11, a first set of the plurality of antenna selection masks applied to 16-bit CRC $<x_{AS, 0}, \ldots, x_{AS, 15}>$ (that is, <0, 0, 0, 0, 0, 0, 0, 0, 0, 0, 0, 0, 0, 0, 0, 0> and <0, 0, 0, 0, 0, 0, 0, 0, 0, 0, 0, 0, 0, 0, 0, 1>) and a second set of the plurality of antenna selection masks applied to 24-bit CRC $<x'_{AS, 0}, \ldots, x'_{AS, 7}>$ (that is, <0, 0, 0, 0, 0, 0, 0, 0> and <0, 0, 0, 0, 0, 0, 0, 1>) may be different from each other.

For example, the first set of the plurality of antenna selection masks applied to the 16-bit CRC may include a first antenna selection mask (for example, <0, 0, 0, 0, 0, 0, 0, 0, 0, 0, 0, 0, 0, 0, 0, 0>) and a second antenna selection mask (for example, <0, 0, 0, 0, 0, 0, 0, 0, 0, 0, 0, 0, 0, 0, 0, 1>). Here, the first antenna selection mask may be used to indicate the first transmit antenna port. Furthermore, the second antenna selection mask may be used to indicate a second transmit antenna port.

Further, the second set of the plurality of antenna selection masks applied to the 24-bit CRC may include a third antenna selection mask (for example, <0, 0, 0, 0, 0, 0, 0, 0>) and a fourth antenna selection mask (for example <0, 0, 0, 0, 0, 0, 0, 1>). Here, the third antenna selection mask may be used to indicate the first transmit antenna port. Furthermore, the fourth antenna selection mask may be used to indicate the second transmit antenna port.

That is, in a case that the number of the CRC parity bits (the value of L) is 16, the first transmit antenna port may be given by the first antenna selection mask. Furthermore, in a case that the number of the CRC parity bits (the value of L) is 24, the first transmit antenna port may be given by the third antenna selection mask. Here, the first antenna selection mask and the third antenna selection mask may be different from each other. For example, the number of bits of the antenna selection mask may be 16 in a case that L is 16, and may be 8 in a case that L is 24. Each value of the bits of the antenna selection mask may be different between the case that L is 16 and the case that L is 24.

Similarly, in a case that the number of CRC parity bits (the value of L) is 16, the second transmit antenna port may be given by the second antenna selection mask. Furthermore, in a case that the number of CRC parity bits (the value of L) is 24, the second transmit antenna port may be given by the fourth antenna selection mask. Here, the second antenna selection mask and the fourth antenna selection mask may be different from each other. For example, the number of bits of the antenna selection mask may be 16 in a case that L is 16, and may be 8 in a case that L is 24. Furthermore, each value of the bits of the antenna selection mask may be different between a case that L is 16 and a case that L is 24.

Here, the terminal device 1 may receive a plurality of transmit antenna selection commands in one subframe, in a case that a plurality of serving cells are configured for the terminal device 1. In this case, the base station device 3 may transmit, to the terminal device 1 for which the plurality of serving cells are configured, a plurality of transmit antenna selection commands indicating the same transmit antenna port (the same value of the transmit antenna port) in one subframe. That is, in a case of receiving a plurality of transmit antenna selection commands in one subframe, the terminal device 1 may consider that the same transmit antenna port (the same value of the transmit antenna port) is indicated by using the plurality of transmit antenna selection commands.

Furthermore, in a case that a higher layer parameter (for example, an RRC layer parameter) is used to enable the closed-loop UE transmit antenna selection, the terminal device 1 may select a transmit antenna port for an SRS by referring to the counted number of transmissions of the SRS. That is, the transmit antenna port for transmission of the SRS may be given by an SRS transmit instance (a subframe for transmission of the SRS) configured by the base station device 3. Here, in a case that a plurality of serving cells are configured for the terminal device 1, the base station device 3 may configure the SRS transmit instance so that the terminal device 1 does not simultaneously transmit an SRS in a different transmit antenna port.

Here, in a case that a plurality of timing advance groups are configured, the terminal device 1 may perform, simultaneous transmission of a PUSCH and a PUCCH, simultaneous transmission of a PUSCH and an SRS, simultaneous transmission of a PUCCH and an SRS, simultaneous transmission of a PRACH and an SRS, and simultaneous transmission of a PRACH and a PUSCH. That is, in a case that a plurality of timing advance group are configured, the terminal device 1 is expected to perform simultaneous transmission of a PUSCH and a PUCCH, simultaneous transmission of a PUCCH and an SRS, simultaneous transmission of a PRACH and an SRS, and simultaneous transmission of a PRACH and a PUSCH.

In a case that a plurality of PUCCH cell groups are configured, or in a case that transmission on the PUCCH in a secondary cell is configured, the terminal device 1 may perform simultaneous transmission of a PUSCH and a PUCCH. In a case that a plurality of PUCCH cell groups are configured, or in a case that transmission on the PUCCH in a secondary cell is configured, the terminal device 1 is expected to perform simultaneous transmission of a PUSCH and a PUCCH.

As described above, in a case that the terminal device 1 is expected to perform simultaneous transmission of an uplink signal to which the transmit antenna selection is applied and an uplink signal to which the transmit antenna selection is not applied, the base station device 3 may instruct the terminal device 1 to disable the transmit antenna selection via the higher layer parameter (ue-TransmitAntennaSelection).

That is, the base station device 3 may not necessarily configure a plurality of timing advance groups, a plurality of PUCCH cell groups, and/or transmission on the PUCCH in a secondary cell for the terminal device 1, for which the transmit antenna selection is configured. That is, the base station device 3 may not necessarily configure the MTA for the terminal device 1, for which the transmit antenna selection is configured. The base station device 3 may not necessarily configure a plurality of PUCCH cell groups for the terminal device 1, for which the transmit antenna selection is configured. The base station device 3 may not necessarily configure transmission on the PUCCH in a secondary cell for the terminal device 1, for which the transmit antenna selection is configured.

Here, the base station device 3 may configure a plurality of PUCCH cell groups for the terminal device 1, for which a plurality of timing advance groups are configured. The base station device 3 may configure transmission on the PUCCH in a secondary cell for the terminal device 1, for which a plurality of timing advance groups are configured. That is, the base station device 3 may configure a plurality of PUCCH cell groups for the terminal device 1, for which the MTA is configured. The base station device 3 may configure a plurality of PUCCH cell groups for the terminal device 1, for which the MTA is configured.

In a case that the transmit antenna selection is configured, the terminal device 1 may not necessarily be expected that a plurality of timing advance groups, a plurality of PUCCH cell groups, and/or transmission on the PUCCH in a secondary cell and/is configured. That is, in a case that the transmit antenna selection is configured, the terminal device 1 may not necessarily be expected that the MTA is configured. In a case that the transmit antenna selection is configured, the terminal device 1 may not necessarily be expected that a plurality of PUCCH cell groups are configured. In a case that the transmit antenna selection is configured, the terminal device 1 may not necessarily be expected that transmission on the PUCCH in a secondary cell is configured.

Here, in a case that a plurality of timing advance groups are configured, the terminal device 1 may be expected that the plurality of PUCCH cell groups are configured. In a case that a plurality of timing advance groups are configured, the terminal device 1 may be expected that transmission on the PUCCH in a secondary cell is configured. In other words, in a case that the MTA is configured, the terminal device 1 may be expected that a plurality of PUCCH cell groups are configured. In a case that the MTA is configured, the base station device 3 may be expected that a plurality of PUCCH cell groups are configured.

Here, the terminal device 1 may transmit functionality information (also referred to as capability information) to be used to indicate whether the terminal device 1 supports various types of functions to the base station device 3. Here, the functionality information may indicate whether a function has been successfully tested for each of a plurality of functions. The functionality information may indicate whether the terminal device 1 supports a predetermined function.

For example, the functionality information may be used to indicate whether: (i) the terminal device 1 supports transmit antenna selection, (ii) the terminal device 1 supports Multiple Timing Advance (MTA), (iii) the terminal device 1 supports a plurality of PUCCH cell groups, and/or (iv) the terminal device 1 supports the transmission on the PUCCH in a secondary cell.

For example, even in a case that the functionality information transmitted by the terminal device 1 indicates that (i) the terminal device 1 supports transmit antenna selection and (ii) the terminal device 1 supports Multiple Timing Advance (MTA), the base station device 3 may not necessarily configure a plurality of timing advance groups for the terminal device 1, for which transmit antenna selection is configured. That is, even in a case that the functionality information transmitted by the terminal device 1 indicates that (i) the terminal device 1 supports transmit antenna selection, and (ii) the terminal device 1 supports Multiple Timing Advance (MTA), the terminal device 1 for which the transmit antenna selection is configured may not necessarily be expected that a plurality of timing advance groups are configured.

Furthermore, even in a case that the functionality information transmitted by the terminal device 1 indicates that (i) the terminal device 1 supports transmit antenna selection, and (ii) the terminal device 1 supports the transmission on the PUCCH in a secondary cell, the base station 3 may not necessarily configure the transmission on the PUCCH in a secondary cell to the terminal device 1, for which the transmit antenna selection is configured. That is, even in a case that the functionality information indicates that (i) the terminal device 1 supports transmit antenna selection, and (ii) the terminal device 1 supports transmission on the PUCCH in a secondary cell by the terminal device 1, the terminal device 1 for which the transmit antenna selection is configured may not necessarily be expected to configure the transmission on the PUCCH in a secondary cell.

Even in a case that UE transmit antenna selection is enabled by a higher layer, the base station device 3 and the terminal device 1 performing operations as described above eliminates the need by the terminal device 1 to use different transmit antenna ports to simultaneously transmit an uplink signal. This simplifies a configuration of a Radio Frequency (RF) unit in the terminal device 1 having a capability of performing the UE transmit antenna selection. Thus, efficient communication by the base station device 3 and the terminal device 1 is enabled.

Heretofore, the present embodiment has been described in detail by referring to the drawings, but the specific configuration is not limited to the above descriptions, and also includes design variations and modifications that fall within the scope and that do not depart from the gist of the present invention. Furthermore, in the present embodiment, even an embodiment obtained by appropriately combining the above-described method/process is included in the technical scope of the present invention.

Hereinafter, a configuration of a device in the present embodiment will be described.

Figure 12:
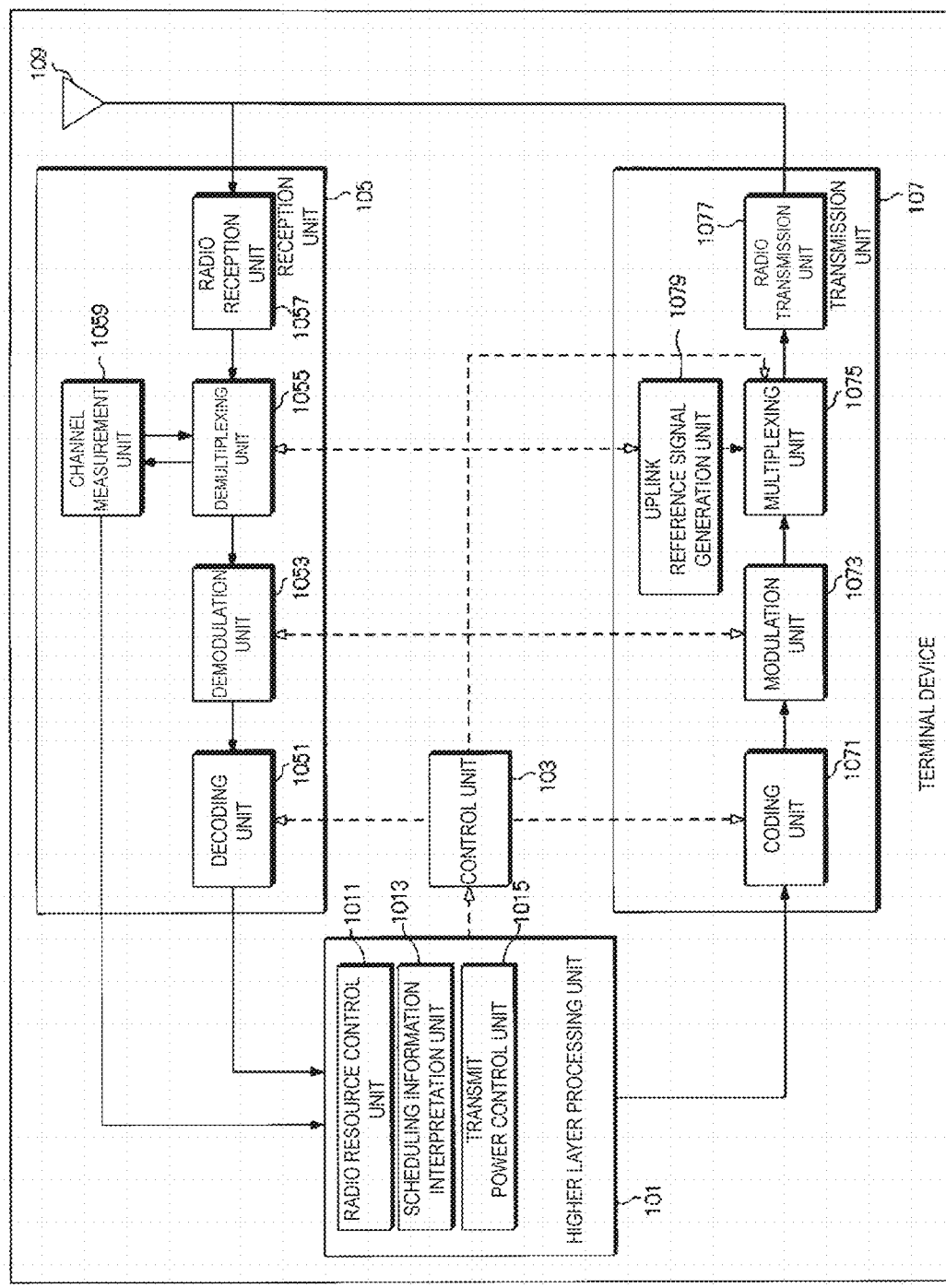
FIG. 12 is a schematic block diagram illustrating a configuration of a terminal device 1 in the present embodiment.

FIG. 12 is a schematic block diagram illustrating a configuration of the terminal device 1 in the present embodiment. As illustrated in the drawing, the terminal device 1 is configured to include a higher layer processor 101, a control unit 103, a reception unit 105, a transmission unit 107, and a transmit and receive antenna 109. The higher layer processing unit 101 is configured to include a radio resource control unit 1011, a scheduling information interpretation unit 1013, and a transmit power control unit 1015. The reception unit 105 is configured to include a decoding unit 1051, a demodulation unit 1053, a demultiplexing unit 1055, a radio reception unit 1057, and a channel measurement unit 1059. The transmission unit 107 is configured to include a coding unit 1071, a modulation unit 1073, a multiplexing unit 1075, a radio transmission unit 1077, and an uplink reference signal generation unit 1079.

The higher layer processing unit 101 outputs uplink data (a transport block) generated by a user's operation or the like, to the transmission unit 107. Furthermore, the higher layer processing unit 101 performs processing of the Medium Access Control (MAC) layer, the Packet Data Convergence Protocol (PDCP) layer, the Radio Link Control (RLC) layer, and the Radio Resource Control (RRC) layer.

The radio resource control unit 1011 included in the higher layer processing unit 101 manages various types of configuration information/parameters of the terminal device 1. The radio resource control unit 1011 sets the various types of configuration information/parameters in accordance with higher layer signaling received from the base station device 3. To be specific, the radio resource control unit 1011 sets the various types of configuration information/parameters in accordance with the information indicating the various types of configuration information/parameters received from the base station device 3. Furthermore, the radio resource control unit 1011 generates information to be mapped to each uplink channel, and outputs the generated information to the transmission unit 107. The radio resource control unit 1011 is also referred to as a configuration unit 1011.

Here, the scheduling information interpretation unit 1013 included in the higher layer processing unit 101 interprets the DCI format (scheduling information) received through the reception unit 105, generates control information for control of the reception unit 105 and the transmission unit 107, in accordance with an interpretation result of the DCI format, and outputs the generated control information to the control unit 103.

The transmit power control unit 1015 included in the higher layer processing unit 101 controls the transmit power for transmission on the PUSCH and the PUCCH in accordance with various configuration information/parameters managed by the radio resource control unit 1011, a TPC command, and the like.

In accordance with the control information originating from the higher layer processing unit 101, the control unit 103 generates a control signal for controlling the reception unit 105 and the transmission unit 107. The control unit 103 outputs the generated control signal to the reception unit 105 and the transmission unit 107 to control the reception unit 105 and the transmission unit 107.

In accordance with the control signal input from the control unit 103, the reception unit 105 receives a signal from the base station device 3 through the transmit and receive antenna 109, and demultiplexes, demodulates, and decodes such a reception signal received from the base station device 3, and outputs information obtained from decoding, to the higher layer processing unit 101.

The radio reception unit 1057 converts (down-converts) a downlink signal received through the transmit and receive antenna 109 into a baseband signal through orthogonal demodulation, removes unnecessary frequency components, controls an amplification level to suitably maintain a signal level, performs orthogonal demodulation based on an in-phase component and an orthogonal component of the received signal, and converts an orthogonally-demodulated analog signal into a digital signal. The radio reception unit 1057 removes a portion corresponding to a Cyclic Prefix (CP) from the digital signal that has been converted, performs Fast Fourier Transform (FFT) on the signal from which the CP has been removed, and extracts a signal in the frequency domain.

The demultiplexing unit 1055 demultiplexes such extracted signals into the PHICH, the PDCCH, the EPDCCH, the PDSCH, and the downlink reference signal. Moreover, the demultiplexing unit 1055 makes a compensation of channels including the PHICH, the PDCCH, the EPDCCH, and the PDSCH, from channel estimate values input from the channel measurement unit 1059. Furthermore, the demultiplexing unit 1055 outputs the downlink reference signal that has been demultiplexed, to the channel measurement unit 1059.

The demodulation unit 1053 multiplies the PHICH with a corresponding code for composition, demodulates a composite signal with a Binary Phase Shift Keying (BPSK) modulation scheme, and outputs a demodulated signal to the decoding unit 1051. The decoding unit 1051 decodes the PHICH addressed to the terminal device 1 and outputs a HARQ indicator that has been decoded to the higher layer processing unit 101. The demodulation unit 1053 demodulates the PDCCH and/or the EPDCCH with a QPSK modulation scheme and outputs a demodulated signal to the decoding unit 1051. The decoding unit 1051 attempts to decode the PDCCH and/or the EPDCCH. In a case of being successful in the decoding, the decoding unit 1051 outputs downlink control information resulting from the decoding and an RNTI, to which the downlink control information corresponds, to the higher layer processing unit 101.

The demodulation unit 1053 demodulates the PDSCH with a modulation scheme notified in a downlink grant, such as Quadrature Phase Shift Keying (QPSK), 16 Quadrature Amplitude Modulation (QAM), or 64 QAM, and outputs demodulated PDSCH to the decoding unit 1051. The decoding unit 1051 decodes the demodulated PDSCH in accordance with information on a coding rate notified in the downlink control information, and outputs, to the higher layer processing unit 101, the downlink data (the transport block) that has been decoded.

The channel measurement unit 1059 measures a downlink path loss or a channel state from the downlink reference signal input from the demultiplexing unit 1055, and outputs the measured path loss or channel state to the higher layer processing unit 101. Furthermore, the channel measurement unit 1059 calculates a downlink channel estimate from the downlink reference signal, and outputs the calculated downlink channel estimate to the demultiplexing unit 1055. The channel measurement unit 1059 performs a channel measurement and/or interference measurement to calculate the CQI (or the CSI).

The transmission unit 107 generates the uplink reference signal in accordance with the control signal input from the control unit 103, codes and modulates the uplink data (the transport block) input from the higher layer processing unit 101, multiplexes the PUCCH, the PUSCH, and the generated uplink reference signal, and transmits the PUCCH, the PUSCH, and the uplink reference signal that have been multiplexed to the base station device 3 through the transmit and receive antenna 109. Furthermore, the transmission unit 107 transmits uplink control information.

The coding unit 1071 performs coding, such as convolutional coding, block coding, or the like, on the uplink control information input from the higher layer processing unit 101. Furthermore, the coding unit 1071 performs turbo coding in accordance with information used for scheduling the PUSCH.

The modulation unit 1073 modulates coded bits input from the coding unit 1071 with the modulation scheme notified in the downlink control information, such as BPS K, QPSK, 16 QAM, or 64 QAM, or with a modulation scheme predefined for each channel. In accordance with the information used for scheduling the PUSCH, the modulation unit 1073 determines the number of data sequences to be spatial-multiplexed, maps multiple pieces of uplink data to be transmitted on the same PUSCH to multiple sequences through Multiple Input Multiple Output Spatial Multiplexing (MIMO SM), and performs precoding on the sequences.

The uplink reference signal generation unit 1079 generates a sequence acquired in accordance with a predefined rule (formula), based on a physical layer cell identifier (also referred to as a Physical Cell Identity (PCI), a cell ID, or the like) for identifying the base station device 3, a bandwidth to which the uplink reference signal is mapped, a cyclic shift that has been notified in the uplink grant, a parameter value for generation of a DMRS sequence, and the like. In accordance with the control signal input from the control unit 103, the multiplexing unit 1075 rearranges modulation symbols of the PUSCH in parallel, and then performs Discrete Fourier Transform (DFT) on the rearranged modulation symbols. Furthermore, the multiplexing unit 1075 multiplexes PUCCH and PUSCH signals and the generated uplink reference signal for each transmit antenna port. To be specific, the multiplexing unit 1075 maps the PUCCH and PUSCH signals and the generated uplink reference signal to the resource elements for each transmit antenna port.

The radio transmission unit 1077 performs Inverse Fast Fourier Transform (IFFT) on a multiplexed signal, generates an SC-FDMA symbol, attaches a CP to the generated SC-FDMA symbol, generates a baseband digital signal, converts the baseband digital signal into an analog signal, removes unnecessary frequency components through a low-pass filter, up-converts the analog signal into a signal of a carrier frequency, performs power amplification, outputs an amplified signal to the transmit and receive antenna 109 for transmission.

Figure 13:
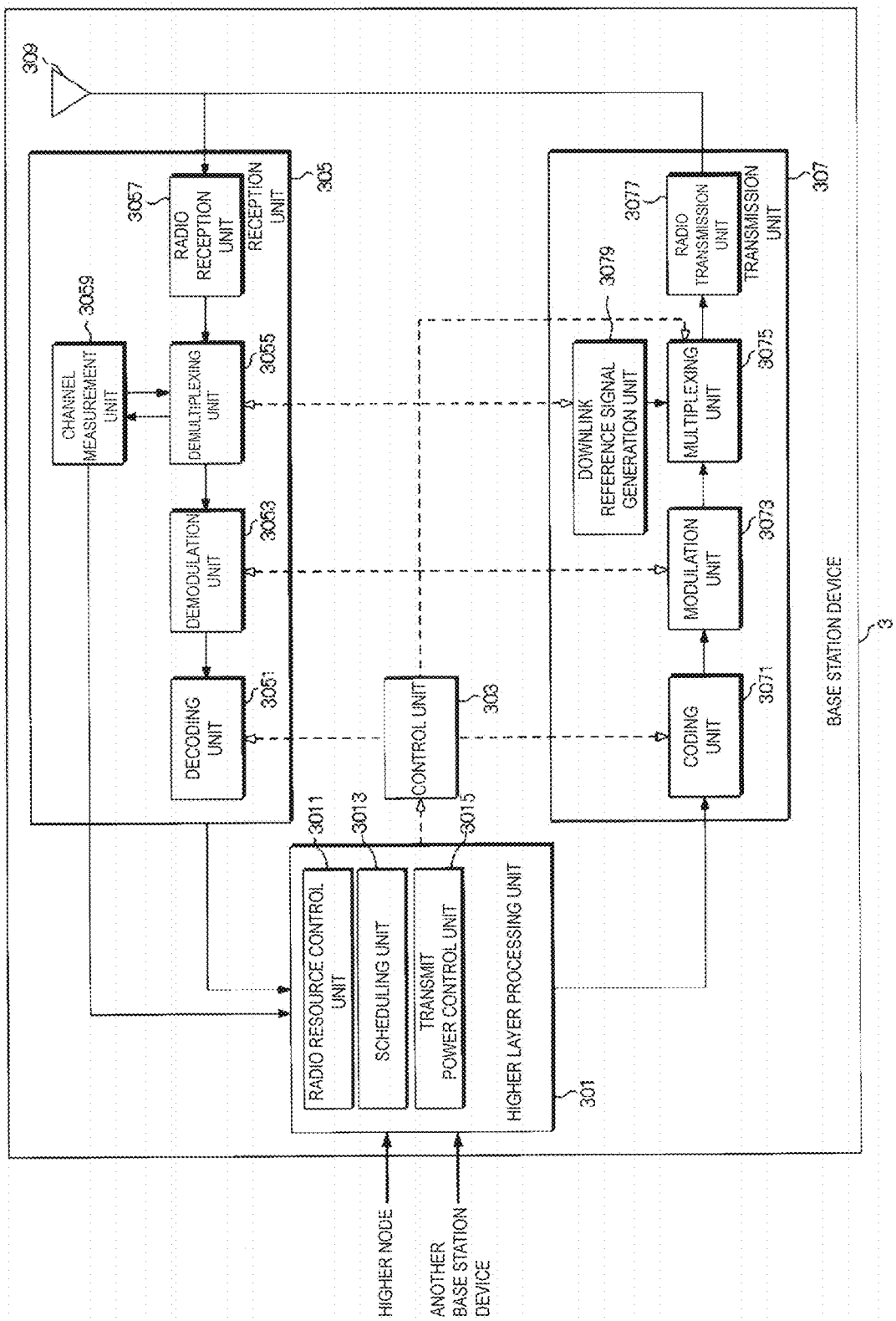
FIG. 13 is a schematic block diagram illustrating a configuration of a base station device 3 in the present embodiment.

FIG. 13 is a schematic block diagram illustrating a configuration of the base station device 3 in the present embodiment. As illustrated in the drawing, the base station device 3 is configured to include a higher layer processing unit 301, a control unit 303, a reception unit 305, a transmission unit 307, and a transmit and receive antenna 309. The higher layer processing unit 301 is configured to include a radio resource control unit 3011, a scheduling unit 3013, and a transmit power control unit 3015. The reception unit 305 is configured to include a decoding unit 3051, a demodulation unit 3053, a demultiplexing unit 3055, a radio reception unit 3057, and a channel measurement unit 3059. The transmission unit 307 is configured to include a coding unit 3071, a modulation unit 3073, a multiplexing unit 3075, a radio transmission unit 3077, and a downlink reference signal generation unit 3079.

The higher layer processing unit 301 performs processing of the Medium Access Control (MAC) layer, the Packet Data Convergence Protocol (PDCP) layer, the Radio Link Control (RLC) layer, and the Radio Resource Control (RRC) layer. Furthermore, the higher layer processing unit 301 generates control information for controlling the reception unit 305 and the transmission unit 307, and outputs the generated control information to the control unit 303.

The radio resource control unit 3011 included in the higher layer processing unit 301 generates or acquires from a higher node, the downlink data (the transport block) mapped to the downlink PDSCH, system information, the RRC message, the MAC Control Element (CE), and the like, and outputs such generated or acquired data to the transmission unit 307. Furthermore, the radio resource control unit 3011 manages various configuration information/parameters for each of the terminal devices 1. The radio resource control unit 3011 may set various configuration information/parameters for each of the terminal devices 1 through higher layer signaling. In other words, the radio resource control unit 1011 transmits/broadcasts information indicating various configuration information/parameters. The radio resource control unit 3011 is also referred to as a configuration unit 3011.

The scheduling unit 3013 included in the higher layer processing unit 301 determines a frequency and a subframe to which the physical channels (the PDSCH and the PUSCH) are allocated, the coding rate and modulation scheme for the physical channels (the PDSCH and the PUSCH), the transmit power, and the like, from the received channel state information and from the channel estimate, channel quality, or the like input from the channel measurement unit 3059. The scheduling unit 3013 generates the control information (for example, the DCI format) to control the reception unit 305 and the transmission unit 307 in accordance with a result of the scheduling, and outputs the generated information to the control unit 303. The scheduling unit 3013 further determines timings of performing transmission processing and reception processing.

The transmit power control unit 3015 included in the higher layer processing unit 301 controls the transmit power for transmission on the PUSCH and the PUCCH performed by the terminal device 1, in accordance with various configuration information/parameters managed by the radio resource control unit 3011, a TPC command, and the like.

In accordance with the control information originating from the higher layer processing unit 301, the control unit 303 generates a control signal for control of the reception unit 305 and the transmission unit 307. The control unit 303 outputs the generated control signal to the reception unit 305 and the transmission unit 307 to control the reception unit 305 and the transmission unit 307.

In accordance with the control signal input from the control unit 303, the reception unit 305 demultiplexes, demodulates, and decodes the reception signal received from the terminal device 1 through the transmit and receive antenna 309, and outputs decoded information to the higher layer processing unit 301. The radio reception unit 3057 converts (down-converts) an uplink signal received through the transmit and receive antenna 309 into a baseband signal through orthogonal demodulation, removes unnecessary frequency components, controls the amplification level to suitably maintain a signal level, performs orthogonal demodulation based on an in-phase component and an orthogonal component of the received signal, and converts the resulting orthogonally-demodulated analog signal into a digital signal. The reception unit 305 receives uplink control information.

The radio reception unit 3057 removes a portion corresponding to a Cyclic Prefix (CP) from the digital signal that has been converted. The radio reception unit 3057 performs Fast Fourier Transform (FFT) on the signal from which the CP has been removed, extracts a signal in the frequency domain, and outputs the extracted signal to the demultiplexing unit 3055.

The demultiplexing unit 1055 demultiplexes the signal input from the radio reception unit 3057 into the PUCCH, the PUSCH, and signals such as an uplink reference signal. The demultiplexing is performed based on radio resource allocation information that has been determined beforehand by the base station device 3 at the radio resource control unit 3011 and that is included in the uplink grant notified to each of the terminal devices 1. Furthermore, the demultiplexing unit 3055 makes a compensation of channels including the PUCCH and the PUSCH from the channel estimate input from the channel measurement unit 3059. Furthermore, the demultiplexing unit 3055 outputs an uplink reference signal that has been demultiplexed, to the channel measurement unit 3059.

The demodulation unit 3053 performs Inverse Discrete Fourier Transform (IDFT) on the PUSCH, acquires modulation symbols, and performs reception signal demodulation, that is, demodulates each of the modulation symbols on the PUCCH and the PUSCH, in accordance with the predefined modulation scheme, such as Binary Phase Shift Keying (BPSK), QPSK, 16 QAM, or 64 QAM, or in accordance with the modulation scheme that the base station device 3 notifies beforehand each of the terminal devices 1 in the uplink grant. The demodulation unit 3053 demultiplexes the modulation symbols of the plurality pieces of uplink data transmitted on the identical PUSCH in the MIMO SM, based on the number of spatial-multiplexed sequences that has been notified beforehand in the uplink grant to each of the terminal devices 1 and information for instructing the precoding to be performed on the sequences.

The decoding unit 3051 decodes the coded bits of the PUCCH and the PUSCH, which have been demodulated, at the coding rate in accordance with a coding scheme prescribed in advance, the coding rate being prescribed in advance or being notified in advance with the uplink grant to the terminal device 1 by the base station device 3 itself, and outputs the decoded uplink data and uplink control information to the higher layer processing unit 101. In a case that the PUSCH is re-transmitted, the decoding unit 3051 performs the decoding with the coded bits input from the higher layer processing unit 301 and retained in an HARQ buffer, and the demodulated coded bits. The channel measurement unit 309 measures the channel estimate, the channel quality, and the like, based on the uplink reference signal input from the demultiplexing unit 3055, and outputs a result of the measurement to the demultiplexing unit 3055 and the higher layer processing unit 301.

The transmission unit 307 generates the downlink reference signal in accordance with the control signal input from the control unit 303, codes and modulates the HARQ indicator, the downlink control information, and the downlink data that are input from the higher layer processing unit 301, multiplexes the PHICH, the PDCCH, the EPDCCH, the PDSCH, and the downlink reference signal, and transmits a result of the multiplexing to the terminal device 1 through the transmit and receive antenna 309.

The coding unit 3071 codes the HARQ indicator, the downlink control information, and the downlink data that are input from the higher layer processing unit 301, in accordance with the coding scheme prescribed in advance, such as block coding, convolutional coding, or turbo coding, or in accordance with the coding scheme determined by the radio resource control unit 3011. The modulation unit 3073 modulates the coded bits input from the coding unit 3071, in accordance with the modulation scheme prescribed in advance, such as BPS K, QPSK, 16 QAM, or 64 QAM, or in accordance with the modulation scheme determined by the radio resource control unit 3011.

The downlink reference signal generation unit 3079 generates, as the downlink reference signal, a sequence that is already known to the terminal device 1 and that is acquired in accordance with a rule prescribed in advance based on the physical layer cell identifier (PCI) for identifying the base station device 3, and the like. The multiplexing unit 3075 multiplexes the modulated modulation symbol of each channel and the generated downlink reference signal. To be specific, the multiplexing unit 3075 maps the modulated modulation symbol of each channel and the generated downlink reference signal to the resource elements.

The radio transmission unit 3077 performs Inverse Fast Fourier Transform (IFFT) on the multiplexed modulation symbol or the like, generates an OFDM symbol, attaches a CP to the generated OFDM symbol, generates a baseband digital signal, converts the baseband digital signal into an analog signal, removes unnecessary frequency components from the analog signal through a lowpass filter, up-converts the analog signal into a signal of a carrier frequency, performs power amplification for the up-converted signal, and outputs the up-converted signal to the transmit and receive antenna 309 for transmission.

More specifically, the terminal device 1 in the present embodiment may include a reception unit 105 configured to receive, from the base station device 3, information on monitoring of DCI, to which first CRC parity bits (for example, 24-bit CRC) are attached, and to monitor DCI, to which the first CRC parity bits or second CRC parity bits (for example, 16-bit CRC) are attached. Here, in a case that a terminal device is configured to monitor DCI, to which the first CRC parity bits are attached, the terminal device may monitor the DCI, to which the first CRC parity bits are attached in a UE-specific search space given by at least a C-RNTI, and the DCI, to which the second CRC parity bits are attached in a common search space. In a case that a terminal device is not configured to monitor DCI, to which the first CRC parity bits are attached, the terminal device may monitor the DCI, to which the second CRC parity bits are attached in the UE-specific search space given by at least a C-RNTI, and the DCI, to which the second CRC parity bits are attached in the common search space. Here, the first CRC parity bits may be 24 bits, and the second CRC parity bits may be 16 bits.

The reception unit 105 may monitor the DCI, to which the second CRC parity bits are attached in a UE-specific search space given by at least a temporary C-RNTI, regardless of whether the terminal device is configured to monitor the DCI to which the first CRC parity bits are attached.

The reception unit 105 may monitor the DCI, to which the second CRC parity bits are attached scrambled with a RA-RNTI in the common search space, regardless of whether the terminal device is configured to monitor the DCI, to which the first CRC parity bits are attached.

Here, the first CRC parity bits may be scrambled with the C-RNTI. The second CRC parity bits may be scrambled with the C-RNTI or the Temporary C-RNTI.

The base station device 3 in the present embodiment may include the transmission unit 307 configured to transmit, to a terminal device, information on monitoring of the DCI, to which first CRC parity bits (for example, 24-bit CRC) are attached, or to transmit, to the terminal device, the DCI, to which the first CRC parity bits or the second CRC parity bits (for example, 16-bit CRC) are attached. In a case of configuring for the terminal device to monitor the DCI, to which the first CRC parity bits are attached, the base station device 3 may transmit the DCI, to which the first CRC parity bits are attached in a UE-specific search space given by at least a C-RNTI, and may transmit the DCI, to which the second CRC parity bits are attached in a common search space. In a case of not configuring for the terminal device to monitor the DCI, to which the first CRC parity bits are attached, the base station device 3 may transmit the DCI, to which the second CRC parity bits are attached in a UE-specific search space given by at least a C-RNTI, and to transmit the DCI, to which the second CRC parity bits are attached in the common search space. Here, the first CRC parity bits may be 24 bits, and the second CRC parity bits may be 16 bits.

The transmission unit 307 may transmit the DCI, to which the second CRC parity bits are attached in a UE-specific search space given by at least a temporary C-RNTI, regardless of whether the terminal device is configured to monitor the DCI, to which the first CRC parity bits are attached.

The transmission unit 307 may transmit the DCI, to which the second CRC parity bits are attached scrambled with an RA-RNTI in the common search space, regardless of whether the terminal device is configured to monitor the DCI, to which the first CRC parity bits are attached.

Here, the first CRC parity bits may be scrambled with the C-RNTI. The second CRC parity bits may be scrambled with the C-RNTI or the Temporary C-RNTI.

Furthermore, the terminal device 1 in the present embodiment may include a reception unit 105 configured to receive a bit sequence $<c_0, \ldots, c_{A+L-1}>$. Here, the bit sequence $<c_0, \ldots, c_{A+L-1}>$ may be given by scrambling CRC parity bits $<b_A, \ldots, b_{A+L-1}>$ in a bit sequence $<b_0, \ldots, b_{A+L-1}>$ with an RNTI $<x_{rnti, 0}, \ldots, x_{rnti, 15}>$. Here, the bit sequence $<b_0, \ldots, b_{A+L-1}>$ may be given by attaching the CRC parity bits $<p_0, \ldots, p_{L-1}>$ to the DCI payload $<a_0, \ldots, a_{A-1}>$. Here, A may indicate the size of the DCI payload, and L may indicate the number of the CRC parity bits. Here, in a case that the L is 24, the bit sequence $<c_0, \ldots, c_{A+L-1}>$ may be given, based on Expression 3. In a case that the L is 16, the bit sequence $<c_0, \ldots, c_{A+L-1}>$ may be given, based on Expression 1. That is, in a case that the L is 16, the bit sequence $<c_0, \ldots, c_{A+L-1}>$ is given by using another expression different from the expression in a case that the L is 24.

Here, an error detection may be performed, based on a bit sequence $<c_A, \ldots, C_{A+L-1}>$ given by scrambling the CRC parity bits $<b_A, \ldots, b_{A+L-1}>$ with the RNTI $<x_{rnti, 0}, \ldots, x_{rnti, 15}>$.

The base station device 3 in the present embodiment may include the transmission unit 307 configured to transmit a bit sequence $<c_0, \ldots, c_{A+L-1}>$. Here, the bit sequence $<c_0, \ldots, c_{A+L-1}>$ may be given by scrambling CRC parity bits $<b_A, \ldots, b_{A+L-1}>$ in a bit sequence $<b_0, \ldots, b_{A+L-1}>$ with the RNTI $<x_{rnti, 0}, \ldots, x_{rnti, 15}>$. Here, the bit sequence $<b_0, \ldots, b_{A+L-1}>$ may be given by attaching the CRC parity bits $<p_0, \ldots, p_{L-1}>$ to the DCI payload $<a_0, \ldots, a_{A-1}>$. Here, A may indicate the size of the DCI payload, and L may indicate the number of the CRC parity bits. Here, in a case that the L is 24, the bit sequence $<c_0, \ldots, c_{A+L-1}>$ may be given, based on Expression 3. In a case that the L is 16, the bit sequence $<c_0, \ldots, c_{A+L-1}>$ may be given, based on Expression 1. That is, in a case that the L is 16, the bit sequence $<c_0, \ldots, c_{A+L-1}>$ is given by using another expression different from the expression in a case that the L is 24.

An error detection may be provided, based on a bit sequence $<c_A, c_{A+L-1}>$ given by scrambling the CRC parity bits $<b_A, \ldots, b_{A+L-1}>$ with the RNTI $<x_{rnti, 0}, \ldots, x_{rnti, 15}>$.

The terminal device 1 in the present embodiment may include the reception unit 105 configured to receive a bit sequence $<c_0, \ldots, c_{A+L-1}>$, and the transmission unit 107 configured to perform, in a case that closed-loop UE transmit antenna selection is configured, transmit antenna selection to a PUSCH, based on an antenna selection mask. Here, in a case that the closed-loop UE transmit antenna selection is configured, the bit sequence $<c_0, \ldots, c_{A+L-1}>$ may be given by scrambling CRC parity bits $<b_A, \ldots, b_{A+L-1}>$ in a bit sequence $<b_0, \ldots, b_{A+L-1}>$ with the RNTI $<x_{rnti, 0}, \ldots, x_{rnti, 15}>$ and the antenna selection mask $<x_{AS, 0}, \ldots, x_{AS, M}>$. Here, the bit sequence $<b_0, \ldots, b_{A+L-1}>$ may be given by attaching the CRC parity bits $<p_0, \ldots, p_{L-1}>$ to the DCI payload $<a_0, \ldots, a_{A-1}>$. Here, A may indicate the size of the DCI payload, L may indicate the number of the CRC parity bits, and M may indicate the number of bits of the antenna selection mask. Here, in a case that a value of the L is 16, a first transmit antenna port is given by a first antenna selection mask $<x_{AS, 0}, \ldots, x_{AS, M}>$, and in a case that the value of L is 24, the first transmit antenna port may be given by a second antenna selection mask $<x_{AS, 0}, \ldots, x_{AS, M}>$, which is different from the first antenna selection mask $<x_{AS, 0}, \ldots, x_{AS, M}>$.

Here, in a case that the L is 24, the bit sequence $<c_0, \ldots, c_{A+L-1}>$ may be given, based on Expression 6. In a case that the L is 16, the bit sequence $<c_0, \ldots, c_{A+L-1}>$ may be given, based on Expression 5. Here, in a case that the L is 24, the M may be 8, and in a case that the L is 16, the M may be 16.

The base station device 3 in the present embodiment may include the transmission unit 307 configured to transmit the bit sequence $<c_0, \ldots, c_{A+L-1}>$, and the reception unit 305 configured to receive, in a case of configuring the closed-loop UE transmit antenna selection, the PUSCH, for which the transmit antenna selection has been performed, based on the antenna selection mask. Here, in the case of configuring the closed-loop UE transmit antenna selection, the bit sequence $<c_0, c_{A+L-1}>$ may be given by scrambling CRC parity bits $<b_A, \ldots, b_{A+L-1}>$ in a bit sequence $<b_0, \ldots, b_{A+L-1}>$ with the RNTI $<x_{rnti, 0}, \ldots, x_{rnti, 15}>$ and the antenna selection mask $<x_{AS, 0}, \ldots, x_{AS, M}>$. Here, the bit sequence $<b_0, \ldots, b_{A+L-1}>$ may be given by attaching the CRC parity bits $<p_0, \ldots, p_{L-1}>$ to the DCI payload $<a_0, \ldots, a_{A-1}>$. Here, A may indicate the size of the DCI payload, L may indicate the number of the CRC parity bits, and M may indicate the number of bits of the antenna selection mask. Here, in a case that a value of the L is 16, a first transmit antenna port is given by a first antenna selection mask $<x_{AS, 0}, \ldots, x_{AS, M}>$, and in a case that the value of L is 24, the first transmit antenna port may be given by a second antenna selection mask $<x_{AS, 0}, \ldots, x_{AS, M}>$, which is different from the first antenna selection mask $<x_{AS, 0}, \ldots, x_{AS, M}>$.

Here, in a case that the L is 24, the bit sequence $<c_0, \ldots, c_{A+L-1}>$ may be given, based on Expression 6. In a case that the L is 16, the bit sequence $<c_0, \ldots, c_{A+L-1}>$ may be given, based on Expression 5. Here, in a case that the L is 24, the M may be 8, and in a case that the L is 16, the M may be 16.

The base station 3 in the present embodiment may include the transmission unit 307 configured to transmit a configuration for the transmit antenna selection to transmit a configuration for Multiple Timing Advance (MTA), and the reception unit 305 configured to receive, from a terminal device, capability information used to indicate whether to support the transmit antenna selection and whether to support the MTA. Here, in a case that the transmit antenna selection is configured for the terminal device, the base station device 3 may not configure the MTA for the terminal device.

The capability information may be used to indicate whether to support transmission on the PUCCH in a secondary cell. Here, in a case of configuring the transmit antenna selection for the terminal device, and in a case of configuring the MTA for the terminal device and not configuring the transmission on the PUCCH in the secondary cell for the terminal device, the base station device 3 may be capable of configuring the transmission on the PUCCH in the secondary cell for the terminal device.

In a case of configuring a plurality of serving cells for the terminal device, and enabling closed-loop UE transmit antenna selection by configuring the transmit antenna selection, the transmission unit 307 may transmit a plurality of transmit antenna selection commands to the terminal device in a given subframe. Here, each of the plurality of transmit antenna selection commands may be used to indicate an identical transmit antenna port for transmission on the PUSCH.

The terminal device 1 in the present embodiment may include the reception unit 105 configured to receive a configuration for transmit antenna selection and receive a configuration for Multiple Timing Advance (MTA), and the transmission unit 307 configured to transmit, to a base station device, capability information used to indicate whether to support the transmit antenna selection and whether to support the MTA. Here, in a case that the transmit antenna selection is configured by the base station device, the terminal device 1 may not be expected that the MTA is configured by the base station device.

The capability information may be used to indicate whether to support transmission on the PUCCH in a secondary cell. Here, in the case that the transmit antenna selection is configured by the base station device, the terminal device 1 is not expected that the transmission on the PUCCH in a secondary cell is configured, and in a case that the MTA is configured by the base station device, the transmission on the PUCCH in a secondary cell may be configurable by the base station device.

In a case that a plurality of serving cells are configured for the terminal device and closed-loop UE transmit antenna selection is enabled by configuring the transmit antenna selection, the reception unit 105 may receive a plurality of transmit antenna selection commands from the base station device in a given subframe. Here, each of the plurality of transmit antenna selection commands may be used to indicate an identical transmit antenna port for transmission on the PUSCH.

Therefore, the base station device 3 and the terminal device 1 are capable of efficiently communicating with each another.

A program running on each of the base station device 3 and the terminal device 1 in some embodiments of the present invention may be a program for controlling a Central Processing Unit (CPU) and the like (a program for causing a computer to operate) to realize the functions in the above-described embodiments of the present invention. The information handled in the above devices is temporarily stored in a Random Access Memory (RAM) while being processed. Thereafter, the information is stored in various types of Read Only Memory (ROM) such as a Flash ROM and a Hard Disk Drive (HDD), and is read by the CPU to be modified or rewritten, as appropriate.

Moreover, the terminal device 1 and the base station device 3 in the above-described embodiments may be partially achieved by a computer. This configuration may be achieved by recording a program for enabling such control functions on a computer-readable medium and causing a computer system to read the program recorded on the recording medium for execution.

The "computer system" refers to a computer system built into the terminal device 1 or into the base station device 3, and the computer system includes an OS and hardware components such as a peripheral device. Furthermore, the "computer-readable recording medium" refers to a portable medium such as a flexible disk, a magneto-optical disk, a ROM, and a CD-ROM, and a storage device, such as a hard disk, built into the computer system.

Moreover, the "computer-readable recording medium" may include a medium for dynamically holding the program for a short period of time, such as a communication line that is used to transmit the program over a network, such as the Internet, or over a communication circuit, such as a telephone circuit, and a medium for holding, in that case, the program for a fixed period of time, such as a volatile memory within a computer system that functions as a server or a client. Furthermore, the program may be configured to enable some of the functions described above, and may also be configured to be capable of enabling the functions described above in combination with a program that has been recorded in the computer system.

Furthermore, the base station device 3 in the above-described embodiments is achievable as an aggregation (a device group) including multiple devices. Respective devices constituting such a device group may include some or all portions of each functionality or each functional block of the base station device 3 in the above-described embodiments. The device group may include at least general functions or general functional blocks of the base station device 3. Furthermore, the terminal device 1 in the above-described embodiments is also capable of communicating with the base station device as an aggregation.

Furthermore, the base station device 3 in the above-described embodiments may be an Evolved Universal Terrestrial Radio Access Network (EUTRAN). Furthermore, the base station device 3 in the above-described embodiments may have some or all portions of the functions of a node higher than an eNodeB.

Furthermore, some or all portions of each of the terminal device 1 and the base station device 3 in the above-described embodiments may be achieved as an LSI, which is a typical integrated circuit or may be achieved as a chip set. The functional blocks of each of the terminal device 1 and the base station device 3 may be individually achieved as a chip, or some or all of the functional blocks may be integrated into a chip. Furthermore, the circuit integration technique is not limited to the LSI, and may be achieved with a dedicated circuit or a general-purpose processor. Furthermore, in a case that advances in the semiconductor technology replace the LSI with another circuit integration technology, an integrated circuit based on such circuit integration technology is applicable.

Furthermore, in the above-described embodiments, the terminal device has been described as one example of a communication device, is not limited to this, and the terminal device is applicable to a fixed-type or stationary-type electronic apparatus installed indoors or outdoors, for example, a terminal device or a communication device, such as an Audio-Video (AV) apparatus, a kitchen appliance, a cleaning or washing machine, an air-conditioning apparatus, office equipment, a vending machine, and other household apparatuses.

The embodiments of the present invention have been described in detail by referring to the drawings, but the specific configuration is not limited to the embodiments, and includes, for example, design variations and modifications that fall within the scope without departing from the gist of the present invention. Furthermore, various modifications are available within the scope of the present invention defined by claims, and embodiments that are made by suitably combining technical measures disclosed in different embodiments are also included in the technical scope of the present invention. Furthermore, a configuration in which a component element that achieves the same effect is substituted for the component element that has been described in the embodiments is also included in the technical scope of the present invention.

INDUSTRIAL APPLICABILITY

Some aspects of the present invention are applicable to a terminal device, a base station device, an integrated circuit, and a communication method that demand transmission of downlink control information efficiently.

DESCRIPTION OF REFERENCE NUMERALS 1 (1A, 1B, 1C) Terminal device
3 Base station device
101 Higher layer processing unit
103 Control unit
105 Reception unit
107 Transmission unit
301 Higher layer processing unit
303 Control unit
305 Reception unit
307 Transmission unit
1011 Radio resource control unit
1013 Scheduling information interpretation unit
1015 Transmit power control unit
3011 Radio resource control unit
3013 Scheduling unit
3015 Transmit power control unit

The invention claimed is:

1. A terminal device comprising:
receiving circuitry configured to receive on a physical downlink control channel (PDCCH), from a base station device, a bit sequence $<c_0, \ldots, c_{A+L-1}>$,
decoding circuitry configured to perform a Cyclic Redundancy Check (CRC) for the bit sequence $<c_0, \ldots, c_{A+L-1}>$, the decoding circuitry being further configured to detect downlink control information, and
transmitting circuitry configured to perform a transmission on a physical uplink shared channel (PUSCH) scheduled by the downlink control information, wherein
the bit sequence $<c_0, \ldots, c_{A+L-1}>$ is given by:
$c_k = b_k$ for k=0, 1, 2, . . . , A+7,
$c_k = (b_k + x_{rnti,k-A-8})$ mod 2 for k=A+8, A+9, A+10, . . . , A+23,
$<x_{rnti,0}, x_{rnti,1}, \ldots, x_{rnti,15}>$ is a Cell-Radio Network Temporary Identifier (C-RNTI),
the $b_k$ is given by:
$b_k = a_k$ for k=0, 1, 2, . . . , A−1,
$b_k = p_{k-A}$ for k=A, A+1, A+2, . . . , A+L−1,
a bit sequence $<a_0, \ldots, a_{A-1}>$ is the downlink control information,
A is a payload size of the downlink control information,
a bit sequence $<p_0, \ldots, p_{L-1}>$ is parity bits for the CRC, and
L is a number of the parity bits for the CRC, which is 24.

2. The terminal device according to claim 1, wherein the PUSCH is used for an uplink shared channel (UL-SCH) transmission.

3. A base station device comprising:
encoding circuitry configured to generate a bit sequence $<c_0, \ldots, c_{A+L-1}>$, a Cyclic Redundancy Check (CRC) being applied to the bit sequence $<c_0, \ldots, c_{A+L-1}>$,
transmitting circuitry configured to transmit on a physical downlink control channel (PDCCH), to a terminal device, the bit sequence $<c_0, \ldots, c_{A+L-1}>$, and
receiving circuitry configured to perform a reception on a physical uplink shared channel (PUSCH) scheduled by a downlink control information, wherein
the bit sequence $<c_0, \ldots, c_{A+L-1}>$ is given by:
$c_k = b_k$ for k=0, 1, 2, . . . , A+7,
$c_k = (b_k + x_{rnti,k-A-8})$ mod 2 for k=A+8, A+9, A+10, . . . , A+23, $\langle x_{rnti,0}, x_{rnti,1}, \ldots, x_{rnti,15} \rangle$ is a Cell-Radio Network Temporary Identifier (C-RNTI),
the $b_k$ is given by:
$b_k = a_k$ for $k=0, 1, 2, \ldots, A-1$,
$b_k = p_{k-A}$ for $k=A, A+1, A+2, \ldots, A+L-1$,
a bit sequence $\langle a_0, \ldots, a_{A-1} \rangle$ is the downlink control information,
A is a payload size of the downlink control information,
a bit sequence $\langle p_0, \ldots, p_{L-1} \rangle$ is parity bits for the CRC, and
L is a number of the parity bits for the CRC, which is 24.

4. The base station device according to claim 3, wherein the PUSCH is used for an uplink shared channel (UL-SCH) reception.

5. A method of a terminal device, comprising:
receiving on a physical downlink control channel (PDCCH), from a base station device, a bit sequence $\langle c_0, \ldots, c_{A+L-1} \rangle$,
performing a Cyclic Redundancy Check (CRC) for the bit sequence $\langle c_0, \ldots, c_{A+L-1} \rangle$,
detecting downlink control information, and
performing a transmission on a physical uplink shared channel (PUSCH) scheduled by the downlink control information, wherein
the bit sequence $\langle c_0, \ldots, c_{A+L-1} \rangle$ is given by:
$c_k = b_k$ for $k=0, 1, 2, \ldots, A+7$,
$c_k = (b_k + x_{rnti,k-A-8})$ mod for $k=A+8, A+9, A+10, \ldots, A+23$,
$\langle x_{rnti,0}, x_{rnti,1}, \ldots, x_{rnti,15} \rangle$ is a Cell-Radio Network Temporary Identifier (C-RNTI),
the $b_k$ is given by:
$b_k = a_k$ for $k=0, 1, 2, \ldots, A-1$,
$b_k = p_{k-A}$ for $k=A, A+1, A+2, \ldots, A+L-1$,
a bit sequence $\langle a_0, \ldots, a_{A-1} \rangle$ is the downlink control information,
A is a payload size of the downlink control information,
a bit sequence $\langle p_0, \ldots, p_{L-1} \rangle$ is parity bits for the CRC, and
L is a number of the parity bits for the CRC, which is 24.

6. The method according to claim 5, wherein the PUSCH is used for an uplink shared channel (UL-SCH) transmission.

7. A method of a base station device, comprising:
generating a bit sequence $\langle c_0, \ldots, c_{A+L-1} \rangle$, a Cyclic Redundancy Check (CRC) being applied to the bit sequence $\langle c_0, \ldots, c_{A+L-1} \rangle$,
transmitting on a physical downlink control channel (PDCCH), to a terminal device, the bit sequence $\langle c_0, \ldots, c_{A+L-1} \rangle$, and
performing a reception on a physical uplink shared channel (PUSCH) scheduled by a downlink control information, wherein
the bit sequence $\langle c_0, \ldots, c_{A+L-1} \rangle$ is given by:
$c_k = b_k$ for $k=0, 1, 2, \ldots, A+7$,
$c_k = (b_k + x_{rnti,k-A-8})$ mod 2 for $k=A+8, A+9, A+10, \ldots, A+23$,
$\langle x_{rnti,0}, x_{rnti,1}, \ldots, x_{rnti,15} \rangle$ is a Cell-Radio Network Temporary Identifier (C-RNTI),
the $b_k$ is given by:
$b_k = a_k$ for $k=0, 1, 2, \ldots, A-1$,
$b_k = p_{k-A}$ for $k=A, A+1, A+2, \ldots, A+L-1$,
a bit sequence $\langle a_0, \ldots, a_{A-1} \rangle$ is the downlink control information,
A is a payload size of the downlink control information,
a bit sequence $\langle p_0, \ldots, p_{L-1} \rangle$ is parity bits for the CRC, and
L is a number of the parity bits for the CRC, which is 24.

8. The method according to claim 7, wherein the PUSCH is used for an uplink shared channel (UL-SCH) reception.

* * * * *